(12) United States Patent
Oba

(10) Patent No.: US 7,676,372 B1
(45) Date of Patent: Mar. 9, 2010

(54) PROSTHETIC HEARING DEVICE THAT TRANSFORMS A DETECTED SPEECH INTO A SPEECH OF A SPEECH FORM ASSISTIVE IN UNDERSTANDING THE SEMANTIC MEANING IN THE DETECTED SPEECH

(75) Inventor: Toshihiko Oba, Tokyo (JP)

(73) Assignee: Yugen Kaisha GM&M, Tokyo (JP)

( * ) Notice: Subject to any disclaimer, the term of this patent is extended or adjusted under 35 U.S.C. 154(b) by 0 days.

(21) Appl. No.: 09/673,360

(22) PCT Filed: Feb. 16, 2000

(86) PCT No.: PCT/JP00/00872

§ 371 (c)(1),
(2), (4) Date: Oct. 16, 2000

(87) PCT Pub. No.: WO00/49834

PCT Pub. Date: Aug. 24, 2000

(30) Foreign Application Priority Data

Feb. 16, 1999 (JP) .............................. P11-037558
Feb. 16, 1999 (JP) .............................. P11-037559

(51) Int. Cl.
*G10L 15/00* (2006.01)
*G10L 21/00* (2006.01)
(52) U.S. Cl. ..................... 704/271; 704/231; 704/270; 434/169; 434/185
(58) Field of Classification Search ................ 704/231, 704/250, 255, 270, 260, 503, 248, 213, 233, 704/275, 246, 261, 251, 272, 266, 271, 229, 704/235, 277, 7, 270.1; 331/312; 600/215; 700/83

See application file for complete search history.

(56) References Cited

U.S. PATENT DOCUMENTS 3,704,345 A * 11/1972 Coker et al. ................ 704/266

(Continued)

FOREIGN PATENT DOCUMENTS

AU 18194/83 A 2/1984

(Continued)

OTHER PUBLICATIONS

Valles et al ("Multimodal Environmental Control System for Elderly and Disabled People", Bridging Disciplines for Biomedicine 18th Annual International Conference of the IEEE, Engineering in Medicine and Biology Society, pp. 516-517, Nov. 1996.*

(Continued)

*Primary Examiner*—David R Hudspeth
*Assistant Examiner*—Justin W Rider
(74) *Attorney, Agent, or Firm*—Brinks Hofer Gilson & Lione

(57) ABSTRACT

A speech transformation apparatus comprises a microphone 21 for detecting speech and generating a speech signal; a signal processor 22 for performing a speech recognition process using the speech signal; a speech information generator for transforming the recognition result responsive to the physical state of the user, the operating conditions, and/or the purpose for using the apparatus; and a display unit 26 and loudspeaker 25 for generating a control signal for outputting a raw recognition result and/or a transformed recognition result. In a speech transformation apparatus thus constituted, speech enunciated by a spoken-language-impaired individual can be transformed and presented to the user, and sounds from outside sources can also be transformed and presented to the user.

13 Claims, 6 Drawing Sheets

U.S. PATENT DOCUMENTS

| | | | |
|---|---|---|---|
| 3,882,285 A | 5/1975 | Nunley et al. | |
| 4,063,048 A | 12/1977 | Kissiah, Jr. | |
| 4,181,813 A * | 1/1980 | Marley | 704/251 |
| 4,284,846 A * | 8/1981 | Marley | 704/253 |
| 4,425,481 A | 1/1984 | Mansgold et al. | |
| 4,545,065 A * | 10/1985 | Visser | 704/213 |
| 4,592,359 A | 6/1986 | Galbraith | |
| 4,593,696 A | 6/1986 | Hochmair et al. | |
| 4,611,598 A | 9/1986 | Hortmann et al. | |
| 4,612,915 A | 9/1986 | Hough et al. | |
| 4,628,528 A | 12/1986 | Bose et al. | 381/90 |
| 4,653,097 A * | 3/1987 | Watanabe et al. | 704/272 |
| 4,821,326 A * | 4/1989 | MacLeod | 704/261 |
| 4,827,516 A * | 5/1989 | Tsukahara et al. | 704/224 |
| 4,947,844 A | 8/1990 | McDermott | |
| 4,972,486 A | 11/1990 | Cornett et al. | |
| 5,085,628 A | 2/1992 | Engebretson et al. | |
| 5,176,620 A | 1/1993 | Gilman | |
| 5,210,803 A | 5/1993 | Martin et al. | |
| 5,283,833 A | 2/1994 | Curhch | |
| 5,326,349 A | 7/1994 | Baraff | |
| 5,377,302 A * | 12/1994 | Tsiang | 704/235 |
| 5,393,236 A * | 2/1995 | Blackmer et al. | 434/169 |
| 5,473,705 A * | 12/1995 | Abe et al. | 704/271 |
| 5,500,920 A * | 3/1996 | Kupiec | 704/270.1 |
| 5,502,774 A * | 3/1996 | Bellegarda et al. | 704/235 |
| 5,544,050 A * | 8/1996 | Abe et al. | 704/7 |
| 5,621,809 A * | 4/1997 | Bellegarda et al. | 704/251 |
| 5,636,285 A * | 6/1997 | Sauer | 381/314 |
| 5,671,329 A * | 9/1997 | Hatazaki | 704/277 |
| 5,794,187 A * | 8/1998 | Franklin et al. | 704/225 |
| 5,812,977 A * | 9/1998 | Douglas | 704/275 |
| 5,839,109 A | 11/1998 | Iwamida | |
| 5,884,257 A * | 3/1999 | Maekawa et al. | 704/248 |
| 5,956,681 A * | 9/1999 | Yamakita | 704/260 |
| 5,983,176 A * | 11/1999 | Hoffert et al. | 704/233 |
| 6,071,123 A * | 6/2000 | Tallal et al. | 434/116 |
| 6,133,904 A * | 10/2000 | Tzirkel-Hancock | 704/255 |
| 6,154,723 A * | 11/2000 | Cox et al. | 704/270 |
| 6,157,727 A * | 12/2000 | Rueda | 381/312 |
| 6,159,014 A * | 12/2000 | Jenkins et al. | 704/503 |
| 6,167,138 A * | 12/2000 | Shennib | 381/60 |
| 6,236,966 B1 * | 5/2001 | Fleming | 704/259 |
| 6,240,392 B1 * | 5/2001 | Butnaru et al. | 704/271 |
| 6,400,996 B1 * | 6/2002 | Hoffberg et al. | 700/83 |
| 6,453,294 B1 * | 9/2002 | Dutta et al. | 704/270.1 |
| 6,460,056 B1 * | 10/2002 | Horii | 704/271 |
| 6,463,412 B1 * | 10/2002 | Baumgartner et al. | 704/246 |
| 6,471,420 B1 * | 10/2002 | Maekawa et al. | 704/250 |
| 6,493,665 B1 * | 12/2002 | Su et al. | 704/230 |
| 6,539,354 B1 * | 3/2003 | Sutton et al. | 704/260 |
| 6,640,145 B2 * | 10/2003 | Hoffberg et al. | 704/7 |

FOREIGN PATENT DOCUMENTS

| | | | |
|---|---|---|---|
| EP | 0 124 930 B1 | | 6/1990 |
| EP | 0 872 808 A1 | | 10/1998 |
| GB | 2 256 959 A | | 12/1992 |
| JP | 64-047800 | * | 5/1976 |
| JP | S51-55604 | | 5/1976 |
| JP | 58-062738 | * | 4/1983 |
| JP | S58-089260 | | 5/1983 |
| JP | S60-143100 | | 7/1985 |
| JP | S61-114472 | | 7/1986 |
| JP | S61-213000 | | 9/1986 |
| JP | 61-264882 | | 11/1986 |
| JP | S61-264882 | | 11/1986 |
| JP | 61-273100 | | 12/1986 |
| JP | S62-224349 | | 10/1987 |
| JP | S62-231981 | | 10/1987 |
| JP | S62-277955 | | 12/1987 |
| JP | S63-249560 | | 10/1988 |
| JP | S63-288552 | | 11/1988 |
| JP | S64-88875 | | 4/1989 |
| JP | S64-088875 | | 4/1989 |
| JP | 02-011438 | * | 1/1990 |
| JP | 02-014000 A | * | 1/1990 |
| JP | H02-97200 | | 4/1990 |
| JP | H03-035296 | | 2/1991 |
| JP | 04-075098 | * | 3/1992 |
| JP | H04-156033 | | 5/1992 |
| JP | H04-502876 | | 5/1992 |
| JP | H04-249990 | | 9/1992 |
| JP | H05-056499 | | 3/1993 |
| JP | 05-083763 | * | 4/1993 |
| JP | H05-83763 | | 4/1993 |
| JP | H05-115096 | | 5/1993 |
| JP | H05-181493 | | 7/1993 |
| JP | H05-289608 | | 11/1993 |
| JP | H06-042760 | | 6/1994 |
| JP | 07-013582 | * | 1/1995 |
| JP | H07-13582 | | 1/1995 |
| JP | 07-084592 | * | 3/1995 |
| JP | H07-84592 | | 3/1995 |
| JP | H07-053168 | | 6/1995 |
| JP | H07-163614 | | 6/1995 |
| JP | H07-181888 | | 7/1995 |
| JP | H07-191599 | | 7/1995 |
| JP | H07-327213 | | 12/1995 |
| JP | H08-065647 | | 3/1996 |
| JP | H08-79897 | | 3/1996 |
| JP | H08-212228 | | 8/1996 |
| JP | 9-116648 A | | 5/1997 |
| JP | H09-182192 | | 7/1997 |
| JP | H09-192164 | | 7/1997 |
| JP | 9-206329 A | | 8/1997 |
| JP | H09-292971 | | 11/1997 |
| JP | H10-108152 | | 4/1998 |
| JP | 10-123450 | * | 5/1998 |
| JP | H10-126895 | | 5/1998 |
| JP | H10-224520 | | 8/1998 |
| JP | H10-228367 | | 8/1998 |
| JP | H10-508442 | | 8/1998 |
| JP | 10-290498 | | 10/1998 |
| JP | H10-290498 | | 10/1998 |
| JP | 11-3369 A | | 1/1999 |
| JP | 2003-044497 | * | 2/2003 |
| WO | WO 91/03913 | | 3/1991 |
| WO | WO 97/29482 A | | 8/1997 |

OTHER PUBLICATIONS

Jiang et al ("Voice-Activated Environmental Control System for Persons with Disabilities", Proceedings of the IEEE 26th Annual Northeast Bioengineering Conference, Apr. 2000, pp. 167-168).*

Seidl et al ("Lighthouse™ for Windows®" 1993 Seidl Computer Engineering Inc.).*

Smartlinc ("Plato Houselinc® Intervace Version 3.01", © 1992, 1997 by Tom Gillespie).*

HAL2000 ("News from HAL", Home Automated Living & provenence documents, Smarthome USA, Apr. 1997—Jul. 1998).*

Kodera, K., Illustrated Otolaryngology: New Approach 1, Medicalview, p. 39, 1996.

McGurk, H. et al., "Hearing Lips and Seeing Voices", Nature 264, pp. 746-748, 1976.

Kuhl P.K. et al., "Human Processing of Auditory Visual Information and Speech Perception", ICSLP 94 S 11.4, Yokohama, 1994.

Saito, H. et al., "Visual and Aural Perception" Ohmsha, pp. 119-120, 1999.

Yanagida, Masuao, "Aging of Speech Listening Ability", IEICE Technical Report SP96-36(Jul. 1996), pp. 25-32, 1996.

Nagao, Katashi et al., "Speech Dialogue With Facial Displays: Multimodal Human-Computer Conversation", Proc. $32^{nd}$ annual meeting of the association for computational linguistics, pp. 102-109, Morgan Kaufmann Publishers, 1994.

Takeuchi, A. et al., "Communicative Facial Displays as a New Conversational Modality", Proc. ACM/IFIP conference on human factors in computing systems (INTERCHI 93), 187 193, ACM Press, 1993.

Nagao, Katashi, "A Preferential Constraint Satisfaction Technique for Natural Language Analysis", Proc. 10th European conference on artificial intelligence, pp. 523-527, John Wiley & Sons, 1992.

Tanaka, H., "Natural Language Processing and its Applications", IEICE, pp. 330-335, Corona Publishing, 1999.

Nagao, K., "Abduction and Dynamic Preference in Plan-Based Dialogue Understanding", Proc. 13th int. joint conference on artificial intelligence, pp. 1186-1192, Morgan Kaufmann Publishers, 1993.

Ekman, P. et al., "Facial Action Coding System", Consulting Psychologists Press, Palo Alto, CA, 1978.

Nakano, Mikio et al., "Understanding Unsegmented User Utterances in Real-Time Spoken Dialogue Systems", Proc. 37th annual meeting of the Association for Computational Linguistics, pp. 200-207.

Dohsaka, K., et al., "A Computational Method of Incremental Utterance Production in Task Oriented Dialogues", Proc. of 16th Int. Conf. on Computational Linguistics, pp. 304-309, 1996.

Dohsaka, K. et al., "A System Architecture for Spoken Utterance Production in Collaborative Dialogue", Working Notes of IJCAI 1997 Workshop on Collaboration, Cooperation and Conflict in Dialogue Systems, 1977.

Dohsaka, K. et al. "Corpus Analysis of Collaborative Principles in Different Dialogue Domains" IEICE Tech. Report NLC 97-58, pp. 25-32, 1998.

Nakano M. et al., "DUG 1—A Spoken Dialogue System with Flexible Turn-Taking" Proc of 5th annual meeting of NLP, 161-164, 1999.

Hirasawa, J., "Implementation of Coordinative Nodding Behavior on Spoken Dialogue Systems", ICSLP 98, 2347 50, 1998.

Takebayashi, Yoichi, "Spontaneous Speech Dialogue TOSBURG II Towards the User-Centered Multi-Model Interface" IEICE trans. vol. J77 D II No. 8, pp. 1417-1428, 1994.

Nukaga N. et al., "On the Control of Prosody Using Word and Sentence Prosody Database", 1998 Meeting of ASJ Society of Japan, pp, 227-228, 1998.

"A Perspective in Automatic Telephone Interpretation" Advanced Telecommunication Research (ATR) Advanced Technical Series, Ohmsha, pp. 177-209, 1994.

Maeda, Noriyasu et al., "Voice Conversion With STRAIGHT", Tech. Report of IEICE, EA98 9, pp. 31-36, 1998.

Abe, M., "Speech Modification Methods for Fundamental Frequency, Duration and Speaker Individuality", Tech. Report of IEICE, SP93 137, pp. 69-75, 1994.

McKeown, K. et al., "Generating Summaries of Multiple New Articles", In Proceedings of 14th annual international ACM SIGIR conference on research and development in information retrieval, pp. 68-73, 1995.

Hovy, E., "Automated Discourse Generation Using Discourse Structure Relations", Artificial Intelligence, 63, pp. 341-385, 1993.

Kupiec, Julian et al., "A Trainable Document Summarizer" In Proceedings of 14th annual international ACM SIGIR conference on research and development in information retrieval pp. 68-73, 1995.

Miike, S. et al., "A Full Text Retrieval System With a Dynamic Abstract Generation Function" Proc. of 17th annual international ACM SIGIR conference on research and development in information retrieval, pp. 152-159, 1994.

Edmundson, H.P., "New Methods in Automatic Abstracting" ACM 16, pp. 264-285, 1969.

Nakazawa, M., "Text Summary Generation System From Spontaneous Speech", 1998 Meeting of ASJ 1 6 1, 1 2, 1998.

Warren, Richard, "Perceptual Restoration of Missing Speech Sounds", Science, vol. 167, p. 392, 1970.

Warren, R.M. et al., "Speech Perception and Phonemic Restoration" Perception and Psychophysics, vol. 9, p. 358, 1971.

Ando, Haru et al., "Analysis of Speech Prominence Characteristics for Translating Speech Dialogue to Sign Language", 1999 meeting of ASJ society of Japan, pp. 377-378, 1999.

Soong, F.K. et al., "On the Use of Instantaneous and Transition Spectral Information in Speaker Recognition", Proc. Of ICASSP 86, pp. 877-880, 1986.

Zheng, Y.C. et al. "Text-Dependent Speaker Identification Using Circular Hidden Markov Models", Proc. of ICASSP 88, pp. 580-582, 1988.

Takezawa, T. et al., "ATR-MATRIX: A Spontaneous Speech Translation System Between English and Japanese", ATR Journal, vol. 2, pp. 29-33, 1999.

Ishikawa, K. et al., "A Computer Recovering Its Own Misheard—Guessing the Original Sentence From a Recognized Result Based on Familiar Expressions", ATR J37, pp. 10-11, 1999.

Kosugi, Makoto, "Human-Face Feature Extraction and Identification by Neural Network", Special Interest Group Notes of IPSJ CVIM, pp. 73-72, pp. 9-16, 1991.

Turk, Matthew A. et al., "Face Recognition Using Eigenfaces", Proc. CVPR, pp. 589-591, 1991.

Akamatsu S. et al., "Robust Face identification by Pattern Matching Based on KL Expansion of the Fourier Spectrum", IEICE trans. vol. J76DII No. 7, pp. 1363-1373, 1993.

Edwards, G.J. et al., "Learning to Identify and Track Faces in Image Sequences", Proc. of FG 98.260 5, 1998.

Nagao, Katashi et al., "Ubiquitous Talker: Spoken Language Interaction with Real World Objects", Proc. 14th IJCAI 95, pp. 1284-1290, 1995.

Sugiuchi T., "The Adjustment and Effectiveness of Bone-Conduction-Type Hearing Aids", Johns vol. 11, No. 9, p. 1304, 1995.

Hosoi, Hiroshi et al., "Activation of the Auditory Cortex by Ultrasound", Lancet, 351 (9101) pp. 496-497, Feb. 14, 1998.

Dobelle, Wm. H., "Artificial Vision for the Blind by Connecting a Television Camera to the Visual Cortex", ASAIO J2000 46, 3 9, 2000.

Rizzo, Joseph F. et al., "Development of an Epiretinal Electronic Visual Prosthesis", MIT Research program in retinal degenerative diseases and experimental theory, Kluwer Academic Plenum Publishers, pp. 463-470, 1999.

MIVIP "Microsystems Based Visual Prosthesis" Catholique Univ. Sci. Appliquees Microelectronics Lab.

Iinami M. et al., "Head-Mounted Projector (II) Implementation", Proc. 4th Ann. Conf. Of VRSJ, pp. 59-62, 1999.

Cruz-Neira, Carolina et al., "Surround-Screen Projection-Based Virtual Reality: The Design and Implementation of the CAVE", Proc. of SIGGRAPH 93, pp. 135-142, 1993.

Hirose, M. et al., "Development and Evaluation of Immersive Multiscreen Display CABIN", IEICE trans. vol. J8ADII No. 5, pp. 888-896, 1998.

Endo, T. et al., "Ultra-Wide Field of View Compact Display", Proc. 4th Annual Conf. Of VRSJ, pp. 55-58, 1999.

Ban, Yoshihiro et al., "Manual-Less Operation with Wearable Augmented Reality System", Proc. 3rd Ann. Conf. of FRSJ, pp. 313,14, 1998.

Ishida, Y. et al., "Interaction Between the Perception of a Moving Sound Image and the Sense of Equilibrium", Technical committee on psychological and physiological acoustics, ASJ H 95 (63), pp. 1-8, 1995.

Hirose, Michitaka et al., "Study on the Olfactory Display" Proceedings, 75th JSME General Conference, pp. 433-434, 1998.

Takala, Tapio et al., "Sound Renderings" Computer Graphics, Proceedings, SIGGRAPH 92 vol. 26 No. 2 pp. 211-220, 1992.

Hirose, Michitaka et al. "A Study on Image Editing Technology for synthetic Sensation", Proceedings, ICAT 94 pp. 63-70, 1994.

Poupyrev, Ivan et al., "Integrating Real and Virtual Worlds in Shared Space", Shared Space Project at SIGGRAPH99.

Wakumoto, M. et al., "Integration of 3-demensional and Pressure Sensitive Palatography for Speech Production Study" Mar. 1999.

Kawai, T., "Mobile Type Interpreter Software" *The Nikkei Business Daily*, Sep. 16, 1999.

"Lip Reading Mobile Phone" *Nikkei Shinbun*, Mar. 22, 2002.

Supplementary European Search Report issued May 4, 2007 in the European Application No. 00903984.3.

Japanese Office Action issued Mar. 19, 2009 in Japanese patent application No. 2000-600451 (with translation), total 3 pages.

* cited by examiner

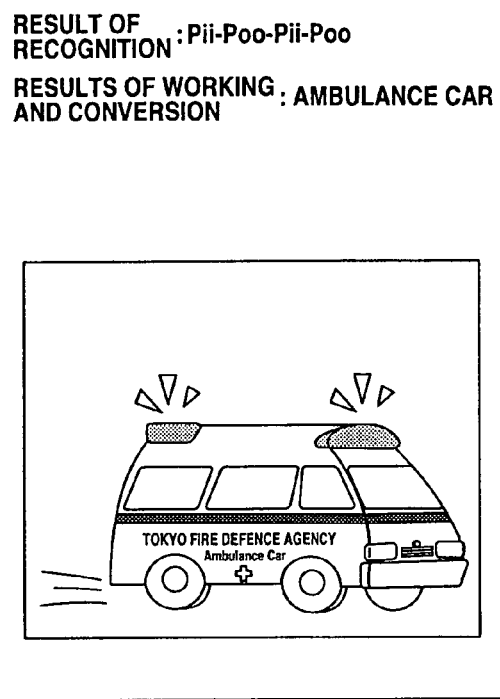
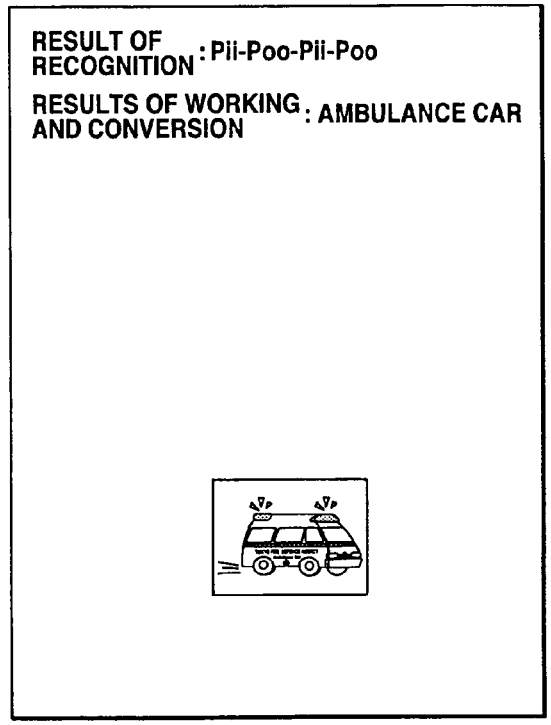
FIG.6A  FIG.6B

PROSTHETIC HEARING DEVICE THAT TRANSFORMS A DETECTED SPEECH INTO A SPEECH OF A SPEECH FORM ASSISTIVE IN UNDERSTANDING THE SEMANTIC MEANING IN THE DETECTED SPEECH

TECHNICAL FIELD

This invention relates to a speech transformation apparatus and method for transforming speech detected by a microphone, etc., to a form that can be readily understood by a hearing-impaired user; or transforming speech enunciated by a person with a speech disorder, or the speech of a person who uses a speech production substitute device (such as an artificial larynx), such as to improve the defective speech.

BACKGROUND ART

Air-conduction type and bone-conduction type HAs (hearing aids) have been known in the past. Insofar as processing methods are concerned, there are analog type HAs (linear-type, non-linear-type (K amplifier), compression-type) and digital HAs. There are a variety of HA types, (box, behind-the-ear, CROS (contra-lateral routing of signal), in-the-ear, bone-anchored, etc.). Kodera describes large desk-top HAs for individual and group training, and smaller personal HAs (see Illustrated Otolaryngology: Kodera K., New Approach 1, Medicalview, 39, 1996).

The digital HA is so constructed that speech as detected by a microphone is first A/D-converted to generate digital data which then is subjected, for example, to Fourier transformation for generating frequency spectral components, after which the amplification factor is calculated, based on the perceptual intensity of the speech, from one frequency component to another. The digital data then is passed through a digital filter for D/A-conversion, to output the resulting analog data to the user's ear. This enables the user to hear a speaker's speech in a noise-reduced state through the digital HA.

A person who has a voice disorder due to a laryngectomy, has lost the phonatory system function through vocal cord vibration, and has dysphonia.

Among the existing speech production substitute devices and methods for people who have had laryngectomies are (1) artificial materials such as the whistle-type artificial larynx using elastic membranes; (2) buzzers, such as the electrolarynx; (3) speech using hypopharyngeal/esophageal mucosa (esophageal/tracheoesophageal speech and tracheophageal speech using voice prostheses); (4) lip-oral electromyography (EMG); (5) phonation/utterance trainers such as CISTA (Computer-Integrated Speech Training Aid); (6) palatographs; and (7) intraoral oscillators.

Digital HAs simply amplify the digital data in each frequency band, while ambient sound is indiscriminately picked up by the microphone, and noise is reproduced as-is, all of which produces a disagreeable feeling in the user. In various types of hearing tests, digital HAs do not show much improvement over analog HAs. Also, conventional digital HAs are not capable of performing processing of detected speech such that the processing differs, depending on the hearing-impaired user's physical impairments (physical state), operating conditions, and/or the purpose for using the HA.

Since speech produced by the above speech production substitutes is not based on vocal cord vibration as it existed before a laryngectomy, the produced voice is inferior in tone quality and does not resemble the user's normal voice.

DISCLOSURE OF THE INVENTION

It is therefore an object of the present invention to provide a speech transformation method and apparatus whereby the results of speech recognition can be presented in a noise-reduced state depending on the hearing-impaired user's physical state, the operating conditions, and/or the purpose for using the apparatus.

It is another object of the present invention to provide a speech transformation method and apparatus whereby a person with a voice-speech disorder ascribable to laryngectomy, tongue/mouth-floor resection or articulation disorder etc. will be able to speak in her own natural voice (or a voice she has changed as desired), and whereby the external speech is outputted to the user to enable spontaneous conversation.

For accomplishing the above objects, the present invention provides a speech transformation apparatus including acousto-electric transducing means for detecting speech to generate speech signals; recognition means for performing speech recognition processing of speech signals from the acousto-electric transducing means; transforming means for transforming the recognition result from the recognition means responsive to a user's physical state, the operating conditions, and/or purpose for using the apparatus; output control means for generating a control signal for outputting recognition results from the recognition means and/or recognition results obtained from transformation operations performed by the transforming means; and output means for outputting the results of recognition by the recognition means and transformation by the transforming means, based on the control signal generated by the control means, to present the recognition result to the user.

For accomplishing the above objects, the present invention also provides a speech transformation method including detecting the speech to a generate speech signal; performing speech recognition processing using the speech signal from an acousto-electric transducing means; transforming the recognition result responsive to a user's physical state, the operating conditions, and/or purpose for using the invention; generating a control signal for outputting the recognition result and/or the transformed recognition result, and outputting the transformed recognition result based on the control signal, for presentation to the user.

Other objects and advantages of the present invention will become clearer from the following explanation of the preferred embodiment and the claims.

BRIEF DESCRIPTION OF THE DRAWINGS

FIG. 6A shows a graphic displayed on the display unit when sound having a prescribed loudness is input to the microphone.

FIG. 6B shows a graphic displayed on the display unit when sound having a loudness less than that of FIG. 6A is input to the microphone.

BEST MODE FOR CARRYING OUT THE INVENTION

A preferred embodiment of the present invention will be explained in detail below, with reference to the drawings.

Figure 1:
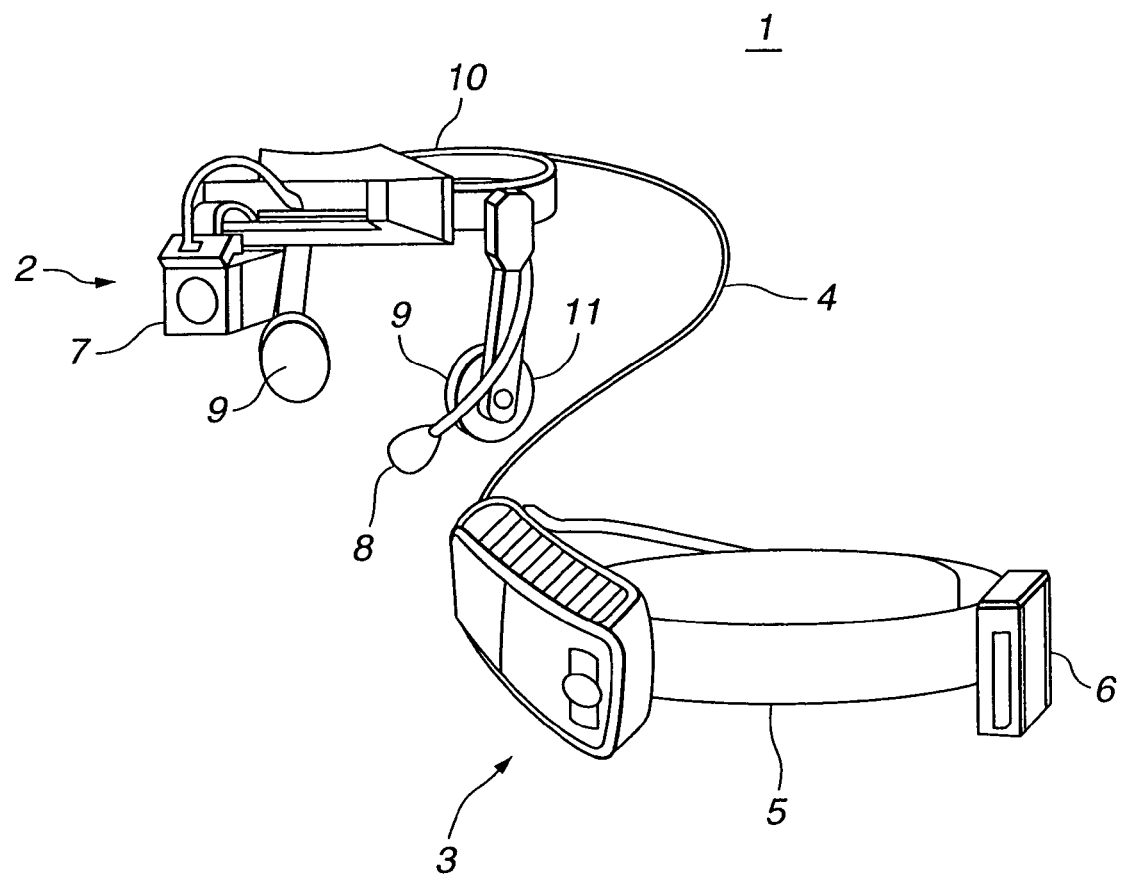
FIG. 1 is a perspective view showing an example of the appearance of an HA (hearing aid) of the present invention.
Figure 2:
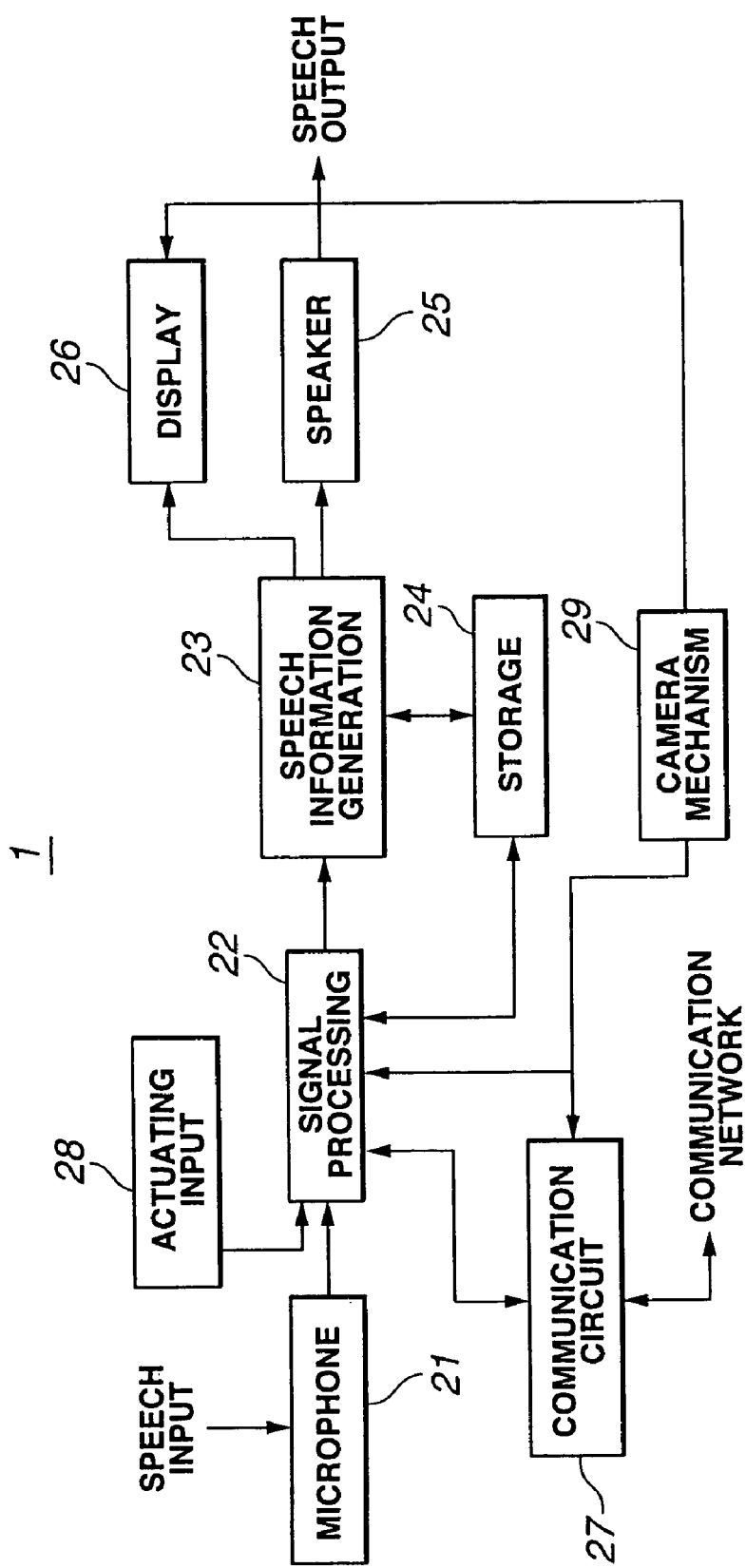
FIG. 2 is a block diagram showing the structure of the HA of the present invention.

In this embodiment, the present invention is applied to a hearing aid (HA) 1 configured as shown for example in FIGS. 1 and 2. This HA 1 is a portable type that includes an HMD (head-mounted display) 2, and a computer 3 for speech recognition and for generation of speech information, etc. The HMD 2 and computer 3 are interconnected over an optical fiber cable 4, as shown in FIG. 1. The computer 3 is attached to a support 5 that is worn, for example, on a user's waist. The computer 3, which is driven by electrical power supplied from a battery 6 that is also attached to the support 5, drives the HMD 2.

The HMD 2 is comprises a display unit 7 placed just in front of the user's eyes; a user microphone 8 for detecting the speech of a user; a speech output unit 9 for outputting speech to the user; a support 10 for supporting the above components on the user's head; and an external microphone 11 for detecting speech, etc., from external sources.

The display unit 7, which is arranged just in front of the user's eye, displays the meaning of speech and other sounds detected by the user microphone 8 and/or the external microphone 11 (to be described later). In response to instructions from the computer 3, the display unit 7 can also display information other than the speech meaning data described above.

The user microphone 8 is placed near the user's mouth so as to detect speech uttered by the user. The user microphone 8 converts the user's speech into electrical signals for output to the computer 3.

The external microphone 11 is mounted on the side of the disk-shaped speech output unit 9. This external microphone 11 detects sound from outside sources, and converts it to electrical signals for output to the computer 3.

The microphones used for the user microphone 8 and the external microphone 11 may be placed in any position, and may be selected from a variety of types, depending on the user's operational needs. They could be of the pressure-type, pressure-gradient-type, parametric-type, laser Doppler-type, bone-conduction-type, ultra-small two-way unit, pick-up, air-conduction, and bone-conduction sound (manufactured by NTT (Nippon Telephone and Telegraph)), non-directional-type, uni-directional (ultra-directional)-type, bi directional-type, dynamic-type, capacitor (electret)-type, zoom-type, stereo-type, MS stereo-type, wireless-type, ceramic-type and magnetic-type, or they could use an acoustic signal processing technology such as acoustic echo cancellation, or could be microphone arrays.

For the earphone, any magnetic earphone may be used. Any suitable commonly used microphone and earphone may be used in a sound enhancement unit or in the HA. Similarly, any suitable microphone commonly used in a middle ear implant, a cochlear implant, an ABI (auditory brainstem implant), a tactile aid or a bone-conduction ultrasound system, may be used. As the sound collection component for these microphones, echo cancellers, for example, may be used.

These microphones 8 and 11 may be provided with ordinary gain adjustments, audio adjustments or output control devices of the 'maximum output power control' or 'automatic recruitment control compression' type.

The user microphone 8 and the external microphone 11 may also be designed as one unit, instead of as separate units as shown in FIG. 1.

The support 10 may be made, for example, of an elastic material, such as a shape memory alloy, for placement on the user's head to permit the mounting of the display unit 7, the user microphone 8 and the speech output unit 9 in their prescribed positions. Although the support 10 shown in the example of FIG. 1 has a support member that extends from the forehead to the back of the head so that the display unit 7 can be set in its prescribed position, this could also be accomplished using a common headset support. A speech output unit 9 could also be provided for each ear.

The computer 3 is attached to the support 5, which would normally be worn, for example, on the user's waist. This computer 3 receives electrical signals from the microphones 8 and 11, as shown in FIG. 2. This computer 3 is provided with a recording medium, on which is stored a program for processing electrical signals; a CPU (central processing unit) for recognizing speech and generating speech information in accordance with programs stored on the recording medium, and so on. The computer 3 may also be formed as an integral part of the HMD 2, and worn on the user's head, instead of being attached to the user's waist.

Based on electrical signals generated from speech detected by the user microphone 8 and/or the external microphone 11, the computer 3 starts a program stored on the recording medium and performs speech recognition processing in the CPU, thus to obtain recognition results. Thus, the computer 3 uses its CPU to obtain the meaning of speech detected by the user microphone 8 and/or the external microphone 11.

Next, the electrical configuration of an HA 1 of the present invention will be described, with reference to FIG. 2. This HA 1 comprises a microphone 21, corresponding to the above microphones 8 and 11, for detecting speech and outputting speech signals; a signal processor 22, contained in the computer 3, for receiving speech signals generated by the microphone 21 and performing speech recognition; a speech information generating unit 23, contained in the computer 3, for generating speech information based on recognition results from the signal processor 22; a memory 24, contained in the computer 3, for storing speech information for being read out to the signal processor 22 and the speech information generating unit 23; a loudspeaker 25, corresponding to the above speech output unit 9, for outputting sound, using speech information from the speech information generating unit 23; and a display unit 26, corresponding to the above display unit 7, for using speech information from the speech information generating unit 23 to display meaning indicated by that information.

The microphone 21 detects speech produced, for example, by speech production substitutes for laryngectomized persons, or speech from external sources, and generates speech signals based on that speech. The microphone 21 outputs the thusly generated speech signals to the signal processor 22.

This microphone 21 is mounted in the vicinity of the user's mouth to detect the speech of the user. This microphone 21 also detects sounds from outside sources, and generates audio signals for them. As before, in the following description, the microphone detecting the user's speech is termed the user microphone 8, and the microphone detecting sound from external sources is termed the external microphone 11. When referring collectively to both microphones, they are simply called microphones.

The signal processor 22 performs a speech recognition process using audio signals from the microphone 21. It performs this processing according to a program for that purpose that may be stored, for example, in an internal memory, not shown. Specifically, the process recognizes audio signals coming from the microphone 21 as 'language' by referring to speech data that was created by sampling the speech of the user and storing it in the memory 24. As a result, the signal processor 22 generates 'recognition results' for audio signals coming from the microphone 21.

The signal processor 22 could perform, for example, speech recognition processing by classification by speech to be recognized, and processing by classification by speaker to be recognized. Among methods for speech recognition processing by classification by speech to be recognized, are the Isolated Word Recognition and Continuous Speech Recognition processes. Among the Continuous Speech Recognition processes performed in the signal processor 22 are Continuous Word Recognition, Sentence Speech Recognition, Conversational Speech Recognition and Speech Understanding. Among methods for speech recognition processing of a speaker to be recognized, there are Speaker Independent Speech, Speaker Dependent Speech, and Speaker Adaptive Speech. Methods of speech recognition that could be used in the signal processor 22 include the Dynamic Programming Matching, Speech Characteristics, and Hidden Markov Model (HMM) methods.

The signal processor 22 also performs speaker recognition, speaker identification and speaker verification based on the input audio. To do this, the signal processor 22 uses a process that extracts the speech characteristics of a speaker's speech, and the frequency response of the speech, to generate a 'speaker recognition result,' which it outputs to the speech information generating unit 23. The signal processor 22 also performs 'specific speaker independent recognition,' by a multi-template method, a statistical method, or a method that uses characteristic values that exhibit minor variations between individuals. Also, possible speaker adaptive processes include one that uses normalization of the individual differences, one that uses correlation of speech data among speakers, one that uses model parameter updating, and one that uses speaker selection. The signal processor 22 performs the above-described speech recognition depending on the user's physical state, operating conditions, and/or purpose for using the system.

The 'user's physical state' might be, for example, the severity of the user's hearing impairment or speech disorder; 'operating conditions' refers to the environment in which the HA 1 is being used (indoors or outdoors, noisy environment, etc.), and 'purpose for use' refers to the user's reason for using the HA 1 (such as improved recognition or easier understanding of speech by the user). The purpose for use may be, for example, to facilitate conversation with familiar people, conversation with a number of unspecified people, attendance at public performances (opera music, etc.), listening to lectures, or conversation with a speech impaired individual.

The signal processor 22 also has a function for memorizing and learning speech inputted to the microphone 21. Specifically, the signal processor 22 retains waveform data for speech detected by the microphone 21 for use in subsequent speech recognition. This further improves speech recognition by the signal processor 22. Moreover, this learning function enables the signal processor 22 to output more accurate processing results.

Stored in the memory 24, are data for speech models that are used for comparison with speech input waveforms when the signal processor 22 is performing speech recognition processing on that input.

Also stored in the memory 24, for example, might be speech data acquired from a person prior to their having a laryngectomy performed (i.e., speech data for speech produced by the vocal cords of the person's phonation system prior to the surgery), or speech data acquired by sampling, in advance, speech the user wants to output later.

Also held in the memory 24 are images that are to be read out by the speech information generating unit 23, based on recognition results and/or transformed recognition results. These images stored in the memory 24 are images that represent patterns symbolizing recognition results, or images representing patterns that might help a user to intuitively understand recognition results.

Among data recorded in the memory 24 are images representing various things. The kinds of images included are pictures, symbols, characters, music notes, photos, moving pictures, animations, illustrations, voice spectrogram patterns and colors.

The speech information generating unit 23 generates speech information using recognition results from the signal processor 22 and speech data (stored in the memory 24) that corresponds to the user's speech. To do this, the speech information generating unit 23 combines speech data stored in the memory 24 based on the recognition results, and also transforms recognition results to generate speech information. The speech information generating unit 23 generates this speech information using an internal CPU and a speech information generator program.

In addition, the speech information generating unit 23 performs a process in which it uses recognition results to analyze speech and reconstruct the speech data, based on the meaning of the analyzed speech, in order to generate speech information for that speech. The speech information generating unit 23 then outputs the speech information thus generated to the loudspeaker 25 and display unit 26.

In addition, the speech information generating unit 23 performs a process for transforming, synthesizing, etc., recognition results from the signal processor 22, responsive to the physical state of the user, the operating conditions, and/or the purpose for using the apparatus. The speech information generating unit 23 also performs a process for presenting speech detected by the microphone 21 to the user, wherein it processes recognition results and/or transformed recognition results, etc.

In addition, the speech information generating unit 23 may modify speech information generated from recognition results to produce new speech information. When so doing, the speech information generating unit 23 may add words that will be easy for the user to understand the meaning of the speech, based on the physical state of the user, the operating conditions, and/or the purpose of use, thus to further enhance the user's speech recognition. For example, if the words "BIG MAC" were spoken into the microphone 21, a speech information generating unit 23 that performs this kind of processing might generate speech information indicating "MAC-DONALD's BIG MAC™."

When the speech information generating unit 23 outputs speech information to the display unit 26, what it outputs is an image descriptive of the meaning of the speech. When it does this, if the speech of the user or a speaker talking to the user, and audio from an outside source, are input to the speech information generating unit 23, causing it to receive, from the signal processor 22, a recognition result specifying an object, then the speech information generating unit 23 will perform a process that reads out the image data for that object from the memory 24 and output it to the display unit 26 for display.

The speech information generating unit 23 is responsive to recognition results from the signal processor 22 to re-output speech information previously output to the speech enhancement unit 25, or to the display unit 26. If, after outputting speech information, the speech information generating unit 23 determines that it has a recognition result indicating that there has been input of speech spoken in response to a desire by the user or by a speaker talking to the user to have that output repeated, the speech information generating unit 23 performs a process to re output the speech information previously output, to the loudspeaker 25, or to the display unit 26. It is also possible for the speech information generating unit 23 to repeatedly output speech information any desired number of times.

It is also possible for the speech information generating unit 23 to re-output speech information previously output to the loudspeaker 25 or to the display unit 26, based on a process for extracting the characteristics of speech from a speaker who is talking to the user, or based on the result of a speaker recognition process using the frequency response characteristics of the speech. It is similarly possible for the speech information generating unit 23 to conduct a spoken dialogue using an AI (artificial intelligence) function, to initiate re-output of speech information previously output to the loudspeaker 25 or to the display unit 26.

It is, moreover, possible for the speech information generating unit 23 to switch between performing and not performing the re outputting operation, responsive to an operational command from an actuating input unit 28. In this case, the user could control switching between performing and not performing a re-outputting operation by operating the actuating input unit 28, with the actuating input unit 28 acting as a switch.

Moreover, when re outputting speech information, the speech information generating unit 23 also selects whether the previously outputted speech information, or speech information different from the previously outputted speech information, will be output in response to an actuating input signal input received from the actuating input unit 28 via the signal processor 22.

The display unit 26 displays speech indicated by speech information generated by the speech information generating unit 23 and pictures taken by a camera system 29.

When operated by the user, the actuating input unit 28 generates an actuating input signal. This actuating input unit 28 may be implemented, for example, as a switch, a keyboard, a mouse, an Internet pad (RF (infrared radiation) wireless system), or a wearable operative interface (prototype: finger and hand position, motion measurement pointing input or gesture input (OLYMPUS)).

The above-described HA 1 is capable of performing processing adapted to an individual user by recognizing speech detected by the microphone 21 (with speech recognition performed by the signal processor 22) to start a program executed by the speech information generating unit 23, based on the recognition result to meet the user's needs. This enables the HA 1 to output speech from the microphone 21 to the loudspeaker 25 and also to display that speech on the display unit 26, thus improving the speech recognition by the user.

Evidence that speech recognition can be improved by providing visual clues in addition to audible speech is suggested by the McGurk effect, in which mis-auding emerges when contradictory phonological information is presented to the visual and auditory senses simultaneously (see "Hearing Lips and Seeing Voice" McGurk H., MacDonald J., Nature 264, 746-748, 1976)); by a paper by Kuhl on the correspondence between voice information from auditory sense, and information of oral formation from the visual sense, in infants (see "Human Processing of Auditory Visual Information in Speech Perception: Potential for multimodal human-machine interfaces, Kuhl, P. K., et al., ICSLP 94 S 11.4, Yokohama, 1994)); and by the ventriloquial effect, in which the visual sense may affect senses related to a sound source. Also, the finding that people in an unconscious state can learn to determine whether something is or is not a sound source supports a conclusion that human communication is inherently multimodal (see Visual and Aural Perception: Saito H., Mori T., Ohmsha, 119-20, 1999).

The hearing impairment of an adult advances with age, with disorders of the internal ear, reduced speech discrimination, central deafness, and mis-hearing occurring more frequently. In cases in which hearing impairment is greater than 100 dB, lip reading becomes predominant, with audition being assistive, and as a result, many hearing impaired persons do not use HAs. Also, for many people with severe hearing impairment, the impairment becomes worse when the maximum output of the HA is increased. It has been reported that for certain hearing problems, even technologies such as cochlear implants, middle ear implants, and auditory brainstem implants are incapable of providing satisfactory improvements in hearing. There are also many people who complain that they can hear sounds, but have difficulty understanding speech. Moreover, adequate lip-reading and sign language skills are difficult to acquire once one reaches adulthood.

The auditory sense is not just a peripheral hearing device with low level functions; it is a comprehensive concept that includes high level brain functions of perception and recognition. Hearing ability is indicated by auditory acuity, which can be measured by a pure tone hearing test. If we assume, however, that the main reason for using a hearing aid is to facilitate communication by the spoken word, what is really important is the degree to which the user recognizes and understands what people are saying.

Conventional hearing aids and cochlear implants, etc., are designed primarily as aids to hearing ability. The HA 1, on the other hand, can be thought of as a device that embodies the additional concept of using recognition by the visual sense as an aid to the auditory sense. It has been reported in the literature that the voice recognition abilities of the hearing impaired can be improved by providing feedback via a screen display and audio (M. Yanagida, "Aging of Speech Listening Ability," IEICE Technical Report SP96-36 (1996-07), 25-32, 1996).

The foregoing suggests that there is a close relationship between the auditory and visual senses, that recognition of speech content can be enhanced by using the visual sense, and that by so doing, speech content can be recognized without using maximum audio output, which will increase the level of satisfaction of the patient. The HA 1 is also effective for auditory training of hearing impaired children.

Speech information, then, can be augmented by displaying recognition results, etc. on the display unit 26, in order to improve recognition of speech by the user. In the HA 1, the meaning of the speech may be communicated to the speaker not only through audible speech, but also through images displayed on the display unit 26, thus to assist conversation.

With the HA 1, since the meaning of the speech can be displayed on the display unit 26 and the meaning of the speech can be output from the loudspeaker 25 by transforming recognition results for speech detected by the user microphone 8 and/or the external microphone 11, speech recognition by the user can be improved further. Thus, in the present HA 1, since the speech information generating unit 23 executes a program that transforms results of speech recognition, and the speech recognition process can be changed responsive to the user's physical state (the extent of hearing impairment, etc.), the operating conditions, and/or the purpose for use, the semantic information of the speech may be displayed in a manner intelligible to the user, and hence the recognition thereof may be improved further.

The loudspeaker 25 outputs speech generated by the speech information generating unit 23. The loudspeaker 25 may be configured, for example, so that (1) speech from the user is output to another person the user is talking to; (2) so that the user's speech is output into his own ear; or (3) so that the other person's speech is output to the user (or to the other person).

This loudspeaker 25 for outputting speech to the user's ear may be of the dynamic or electrostatic (capacitor) type, and may also be in the form of a headphone (such as the in the air type—open-air or in-the-ear canal type). Also, the loudspeaker 25 may be of the kind used in a conventional HA, voice augmenter, or sound pickup speaker, which may be of the type employing a magnetic loop; or it could be a speaker system that transmits sound vibrations through the user's finger, inserted into the ear. (The WISPER phone, developed by NTT DOCOMO's prototype of this technology). Basically, this loudspeaker 25 for facilitating conversations by the user may be any commonly used speaker device.

It is also possible for the loudspeaker 25 to output the sound oppositely phased with respect to speech output based on the speech information. This results in cancellation of noise components included in the speech output by the loudspeaker 25, thus providing low-noise speech output to the user and others in conversations with the user.

This HA 1 includes a communication circuit 27 that is connected to an external communication network. This communication circuit 27 receives inputs of speech enunciated by e.g., a person with voice-speech disorders, or sound from an outside source, over a communication network. Examples of such networks are given below: telephone networks (ISDN (integrated services digital network), ADSL (asymmetric digital subscriber line), xDSL (xdigital subscriber line)), FAX, telex, mobile communication networks (CDMA (code division multiple access), WCDMA (wideband code division multiple access), GSM (global system for mobile communications), PHS (personal handyphone system), Pager-net (DARC (data radio channel) (FM-teletext), high-speed-pagers, FM-pagers), IMT2000 (international mobile telecommunications 2000), PCS (personal communication services), MMAC (multimedia mobile access), IRIDIUM™ (iridium satellite-telephone system), servicing network (I-MO-DET™: NTT DOCOMO)), internet (ASP: application service provider), LAN (local area network), radio communication network (AM/FM-system, TV communication, BLUETOOTH™, infrared radiation IrDA (infra-red data association), ultrasound, amateur-radio, cable-network, such as OSAKA-USEN-HOUSO, satellite communications (BS (broadcasting satellite)/CS (communication satellite)), optical-communication, cable networks, etc). The communication circuit 27 inputs speech data to the signal processor 22. Also, the communication circuit 27 outputs, to the external network, signals that have been signal-processed by the signal processor 22 and speech information generated by the speech information generating unit 23, etc., and inputs, from the external network, data that has been signal-processed and data for changing or controlling HA 1 internal processes.

With the communication circuit 27, television broadcasts (digital broadcasts), teletext or text-radio received via the signal processor 22 and the speech information generating unit 23 may be displayed on the display unit 26. It is noted that the communication circuit 27 includes a teletext tuner for receiving specific data desired by the user.

With an HA 1 configured as described above, if the user has had a laryngectomy, and is using an artificial electro larynx to speak into the microphone 21, that speech input will be recognized by the signal processor 22, and the speech information output by the speech information generating unit 23 for that speech will be generated using speech data for the person's normal speech (data for speech sampled prior to the laryngectomy, and stored in the memory 24). Thus speech outputted from the loudspeaker 25 can be output in a voice similar to that of the user as it sounded prior to the laryngectomy.

In the foregoing description of the HA 1 according to the present invention, speech uttered by a laryngectomized user was detected by the microphone 21. The HA 1 may also, however, be used for detecting the speech of persons suffering from various articulation disorders among the speech disorders caused by hearing impairment, or the voice of a person assisted by a respiratory device. For this application, the HA 1 would retain, in the memory 24, the speech of the person suffering the speech disorder, and responsive to phonation by the enunciating person, would access the memorized speech data in the memory 24 corresponding to the speech of the enunciating person, in order to execute speech recognition processing in the signal processor 22 and combine the speech data in the speech information generating unit 23, responsive to the recognition results, to generate speech information to output speech from the loudspeaker 25 free of the speech disorder, and to display the meaning of the speech (derived from the speech information) on the display unit 26.

Thus, with the present HA 1, speech enunciated by a laryngectomized person using a speech production substitute device can be displayed, as is, on the display unit 26, thereby making the user realize her mistake, to correct the unnatural speech.

For example, when pronouncing the Japanese words for 'today is . . . ,' a person with an articulation disorder due to hearing impairment would tend to say "kyon wa" instead of the correct pronunciation of "kyou wa." This is due to the absence of voice feedback. However, if, with the use of the HA 1, the above-described processing is carried out, the incorrect pronunciation would be corrected to the normal pronunciation "kyou wa" when output from the loudspeaker 25.

Moreover, because the present HA 1 is provided with a display unit 26, the meaning of the speech of the enunciating person can be displayed, thus providing a system convenient for speech training and learning, for people with voice disorders or hearing impaired persons.

Several examples of transformation, in which the results of recognition from the signal processor 22 are transformed by the speech information generating unit 23, for generating speech information or combining speech data, are hereinafter explained. It is to be noted that the several examples of transformation processing given below are merely illustrative of the preferred embodiments of the invention.

When transforming recognition results from the signal processor 22, the speech information generating unit 23 may use artificial intelligence to transform the recognition results to generate speech information. The speech information generating unit 23 may use, for example, a speech dialogue system. Elderly sufferers of hearing impairment tend to ask people to repeat what they have said. However, when the present invention is used to transform the results of recognition, the HA 1 has a dialogue with the user wherein information on what has been said by the person she is talking to is saved. This saved speech information can be effective in improving the speech recognition capabilities of the user, who can thereby have things repeated without actually asking the opponent speaker to repeat his/her words.

Such a system may be realized using a speech dialogue system with expressions as a multi-modal dialogue system. This multi-modal dialogue system employs a combination of modalities such as direct operation pen gesture technology (an input technology that uses a pointing device and tablet), text input technology, speech input/output technology, such as speech recognition, VR (virtual reality) system technology, employing visual, auditory, tactile, or force sense, or non-linguistic technology. The speech information generating unit 23 in this case employs various modalities as means for augmenting speech information, dialogue context information (or means for augmenting it), or as means of mitigating the recognition load workload or psychological resistance otherwise imposed on the user. For the non-linguistic interface, a hand gesture interface may be used, in which case, for gesture interface measurement, gesture tracking will be required for gesture measurement using a sensor worn by the user. To this end, a glove device and magnetic or optical position measurement may be used. For non-contact gesture measurement, stereoscopic analysis of a marker in an image or 3D reconstruction may be used.

This multi-modal dialogue system is described in detail in "Speech dialogue with facial displays Multimodal human-computer conversation" (Nagao K., Takeuchi A., Proc. 32nd annual meeting of the association for computational linguistics, 102-109, Morgan Kaufmann Publishers, 1994); and "Communicative facial displays as a new conversational modality" (Takeuchi A., Nagao K., Proc. ACM/IFIP conference on human factors in computing systems (INTERCHI 93), 187-193, ACM Press, 1993).

For the speech dialogue system employing an AI function, the speech detected by the microphone 21 is processed with A/D conversion, acoustic analysis and vector quantization by the signal processor 22, and the best hypothesis for a word level having the highest score is generated by a speech recognition module. The speech information generating unit 23 presumes phonemes from the vector quantization code, using the HMM-based phoneme model, to generate a string of words. The speech information generating unit 23 converts the generated word string into a meaning expression using a sentence construction and meaning analysis module. Next the speech information generating unit 23 analyzes the sentence structure, using unified grammar, then resolves ambiguities using a frame-based knowledge base and an instance base (a sentence pattern obtained by analysis of exemplary sentences). After determining the meaning of the phonation, the intention of the user is recognized by a plan recognition module. This is based on a belief model for the user, which is dynamically corrected and expanded as the dialogue proceeds, and on a plan concerning the goal of the dialogue. In the intention recognizing module, the subject is supervised, pronoun correspondence is resolved, and the abbreviated portions are supplemented. Then a module that generates a concordant response based on the user's intention is started. This module embeds information concerning the response obtained by area knowledge in a phonation pattern of a template provided at the outset, to generate the phonation. This response is turned into speech by the speech synthesis module. Meanwhile, the processing executed by the signal processor 22 and the speech information generating unit 23 may be processing such as that described in, for example, "A preferential constraint satisfaction technique for natural language analysis" (Nagao N., Proc. 10th European conference on artificial intelligence, 523-527, John Wiley & Sons, 1992); "Natural language processing and its applications" (Tanaka H., IEICE, 330-335, Corona Publishing, 1999); and "Abduction and dynamic preference in plan-based dialogue understanding" (Nagao K., Proceedings 13th int. joint conf. on artificial intelligence, 1186-1192, Morgan Kaufmann Publishers, 1993).

For the process using the AI function, the speech information generating unit 23 performs system impersonation to perform speech recognition, sentence construction, meaning analysis, plan recognition, expression parameter adjustment and expression animation, using the display unit 26 as visual means, to mitigate the load in recognition and psychological resistant feelings in the user, with respect to speech dialogue. For the processing performed by the speech information generating unit 23, there is FACS (Facial Action Coding System). See also Facial Action Coding System: Ekman P., Friesen W. V., Consulting Psychologists Press, Palo Alto. Calif., 1978.

The speech information generating unit 23 is a spoken dialogue system: an AI system that uses speech and images. This AI system comprises incremental utterance understanding in real-time spoken language ("Understanding unsegmented user utterances in real-time spoken dialogue systems" Nakano M., Proc. of 37th annual meeting of the Association for Computational Linguistics, 200-207), and incremental utterance production, the contents of which can be changed sequentially ("A Computational Model of Incremental Utterance Production in Task Oriented Dialogues" Dohsaka K., Shimazu A., Proceedings of 16th Int. Conf. on Computational Linguistics, 304-309, 1996; "System Architecture for Spoken Utterance Production in Collaborative Dialogue" Dohsaka K., Shimazu A., Working Notes of IJCAI 1997 Workshop on Collaboration, Cooperation and Conflict in Dialogue Systems, 1997; "Corpus analysis of collaborative principles in different dialogue domains" Dohsaka K., et al., IEICE tech. report NLC 97-58, 25-32, 1998). Also see "DUG 1—A Spoken Dialogue System with Flexible Turn-taking" Nakano M., et al, Proc. of 5th ann. meeting of NLP, 161-164, 1999. It is noted that, in the speech information generating unit 23, the process of understanding and the process of response operate in parallel. The speech information generating unit 23 also sequentially sends word candidates, simultaneously with speech recognition, to the speech processor, using the ISTAR protocol (see "Implementation of coordinative nodding behavior on spoken dialogue systems" Hirasawa J., ICSLP-98, 2347-50, 1998).

That is, the HA 1 recognizes speech from the user and/or from outside sources, in terms of a pre-set minimum grammatical unit (the smallest segment of speech that carries meaning), by employing the technique used in the speech dialogue system DUG 1, manufactured by NTT. The HA 1 also performs a process for generating speech information based on the same grammatical unit. The speech information generating unit 23 is able to incidentally stop or start the speech recognition processing and the speech information recognition processing, responsive to speech from the user and/or from outside sources, thus realizing efficient processing. Moreover, since this HA 1 is able to control speech recognition processing and speech information generation processing responsive to the user's speech, speaker changes can be realized flexibly. That is, the processing can be changed by detecting the speech from the user and/or from outside sources during generation of the speech information, to change the contents of the speech information to be presented to the user.

The speech information generating unit 23 can also perform processing for understanding the free phonation of the user using keyword spotting. (See "Spontaneous speech dialogue TOSBURG II towards the user-centered multi-model interface" Takabayashi Y., IEICE trans. vol. J77-D-II No. 8, 1417-28, 1994).

The speech information generating unit 23 can also transform speech information with intonation, stressing or accentuation, for example, to output the so-transformed speech information. When so doing, the speech information generating unit 23 transforms speech information to change the intensity of the intonation, stressing or accentuation of a particular pronunciation, as necessary, to output the so-transformed speech information.

The prosody control system may use words and text prosody as a database (see for example "On the control of prosody using word and sentence prosody database" Nukaga N., et al., 1998 Meeting of ASJ Society of Japan, 227-8, 1998).

When synthesizing speech data, the speech information generating unit 23 can execute speech synthesis by rule, irrespective of the speech content, speech synthesis employing variable length unit to synthesize smooth speech, prosody control to produce natural speech on synthesis, or quantizing conversion for furnishing the speech with personality when generating speech information (see "A perspective in automatic telephone interpretation" Advanced Telecommunication Research (ATR) Advanced Technical Series, Ohmsha, 177-209, 1994).

High sound quality speech can also be synthesized using a vocoder, which uses STRAIGHT (speech transformation and representation technique based on adaptive interpolation of weighted spectrogram) (see "Voice Conversion with STRAIGHT" Maeda N., et al., Tech. report of IEICE, EA 98-9, 31-6, 1998).

Moreover, with the present speech information generating unit 23, the information on speech content (rhythmic information) or information on sound pitch or loudness (prosody-related information) can be adjusted to the sound pitch easiest for the user to hear, in keeping with the properties of the user's hearing impairment, by using text-to-speech synthesis to create speech from text information. In addition, the speech information generating unit 23 performs transformation of characteristic speech quantities, such as by speech speed conversion or frequency compression. In addition, the speech information generating unit 23 applies frequency band expansion for adjusting the frequency band of the output speech or applies speech enhancement processing to the speech information. The frequency band expansion or speech enhancement may be realized using techniques described for example, in "Speech modification methods for fundamental frequency, duration and speaker individuality" Abe M., Tech. report of IEICE, SP93-137, 69-75, 1994). Instead of the signal processor 22 and the speech information generating unit 23 performing speech recognition processing and transformation of the results of recognition, it is possible for the signal processor 22 and the speech information generating unit 23 to perform only the above processing, to output the result to the loudspeaker 25. It is also possible for the HA 1 to output the result of the recognition and/or the result of the above processing simultaneously, or with a time lag. It is also possible for the HA 1 to output the recognition results and/or processing results so that different content will be output at the loudspeaker 25 and the right and left channels of the display unit 26.

It is also possible for the speech information generating unit 23 not only to perform a process for interpreting the language from the speech data, using the recognition results, and constructing speech information from the speech data using the so-interpreted language, but also to perform the process for transforming the language from other processing interpreted on the basis of the results of recognition. That is, it is possible for the present speech information generating unit 23 to construct speech information and to perform speed conversion for changing the rate at which speech information is output to the loudspeaker 25, such as to elongate the voiced domain by splitting or elongating the pitch domain, not transforming the voice domain, or shortening the non-speech domain. That is, this speed conversion is performed by selecting an appropriate speed for the user's physical state.

Moreover, it is possible for the speech information generating unit 23 to perform, for example, interpretation processing, such as translation of the speech information from Japanese to English, responsive to the results of recognition, to output transformed (translated) information. This technique may be applicable to automatic telephone interpretation in conjunction with a communication function. It is also possible for the speech information generating unit 23 to perform 'automatic abstraction for summary transformation' (e.g., conversion of 'United States of America' to 'USA') for output as speech information.

Other examples of automatic abstraction that can be performed by the speech information generating unit 23 include a generation process consisting of picking up from sentences, cue expressions that might be helpful in preparing an abstract, and generating understandable sentence expressions based on that abstract (see "Generating summaries of multiple news articles" Mckeown K., Radev D. R., In Proceedings of 14th annual international ACM SIGIR conference on research and development in information retrieval, 68-73, 1995; "Automated discourse generation using discourse structure relations" Hovy E., Artificial Intelligence, 63, 341-385, 1993); and an abstracting process in which the abstract is viewed as a slice, and a topic is established to enable subjective evaluation (see "A trainable document summarizer" Kupiec J., et al., In Proceedings of 14th annual international ACM SIGIR conference on research and development in information retrieval, 68-73, 1995; "A full text retrieval system with a dynamic abstract generation function" Miike S., et al., Proc. of 17th annual international ACM SIGIR conference on research and development in information retrieval, 152-159, 1994; "New methods in automatic abstracting" Edmundson H. P., J of ACM 16, 264-85, 1969). In addition, the speech information generating unit 23 permits word recognition, exemplified by extraction of important keywords using the Partial Matching Method and Incremental Reference Interval-Free continuous data processing, and performance of word recognition using Incremental Path Method (see "Text summary generation system from spontaneous speech" Nakazawa M., et al., 1998 meeting of ASJ 1-6-1, 1-2, 1998).

The speech information generating unit 23 may also be controlled, responsive to the recognition results, such that instead of deleting certain sounds in specific phonemes, vowels, consonants, accents, it outputs buzzer sounds, yawning sounds, coughing sounds, tones, etc., along with the speech information. To do this, the speech information generating unit 23 processes the speech information by a technique disclosed in, for example, in "Perceptual restoration of missing speech sounds" (Warren R. M., Science vol. 167, 392, 1970);

and "Speech perception and phonemic restoration" (Warren R. M., Obusek C. J., Perception and psychophysics Vol. 9, 358, 1971).

By using the recognition results, the speech information generating unit 23 can be made to convert sound to a 'horn tone' and output it as speech information. (A horn tone can be created by a technique for reproducing a heavy bass pitch sound using tube resonance, wherein sound with a bandwidth no greater than about 2000 Hz is amplified by a sound pickup tube, with a gain of about 15 dB.) The speech information generating unit 23 can also output speech information after the speech has been converted to a sound similar to that output using an acoustic (WAVEGUIDE™) such as disclosed in U.S. Pat. No. 4,628,528, or to output the sound from the speaker through a tube, based on acoustic (WAVEGUIDE™) technology (example: Wave radio (BOSE)). It is also possible for the speech information generating unit 23 to output speech information after passing the speech through a filter that passes only the low pitch sound. For example, SUVAG (System Universal Verbo-tonal d'Audition-Guberina) may be used to perform filtering to pass only speech of a prescribed frequency band to output the resulting speech information.

If it is determined that sound entering the microphone 21 is music, the speech information generating unit 23 could perform a process to generate a color display, or could transform the speech information by a process realized by the 'Song-Raita' or 'Voice-to-Score R' systems (XG works3.0 (YAMAHA)) to display the musical notes on the display unit 26. The speech information generating unit 23 could also convert the speech (music) information to a signal that would flash on and off in the display 26 in time with the music, so that the user can sense the rhythm, or it could present the speech (music) as a display of color, or as spectrogram pattern.

If the speech information generating unit 23 determines that an emitted sound, such an audible alarm, has been fed to the microphone 21, it can transform the sound into a speech signal that will display, on the display unit 26, that an alarm etc. has been detected by the microphone 21, or to output content to communicate the meaning of the alarm through the loudspeaker 25.

If the speech information generating unit 23 has detected an alarm bell, a siren of an ambulance or a siren warning of an oncoming tsunami, it not only generates a display to that effect, but also outputs from the loudspeaker 25 a voiced announcement such as "FIRE!" or "AMBULANCE APPROACHING" or "TSUNAMI COMING" at high volume, while displaying an image depicting a fire, an ambulance, or a tsunami, on the display unit 26.

This will enable the hearing-impaired to be informed of an emergency by both speech and image, which could help them to avoid serious injury or death.

Figure 3:
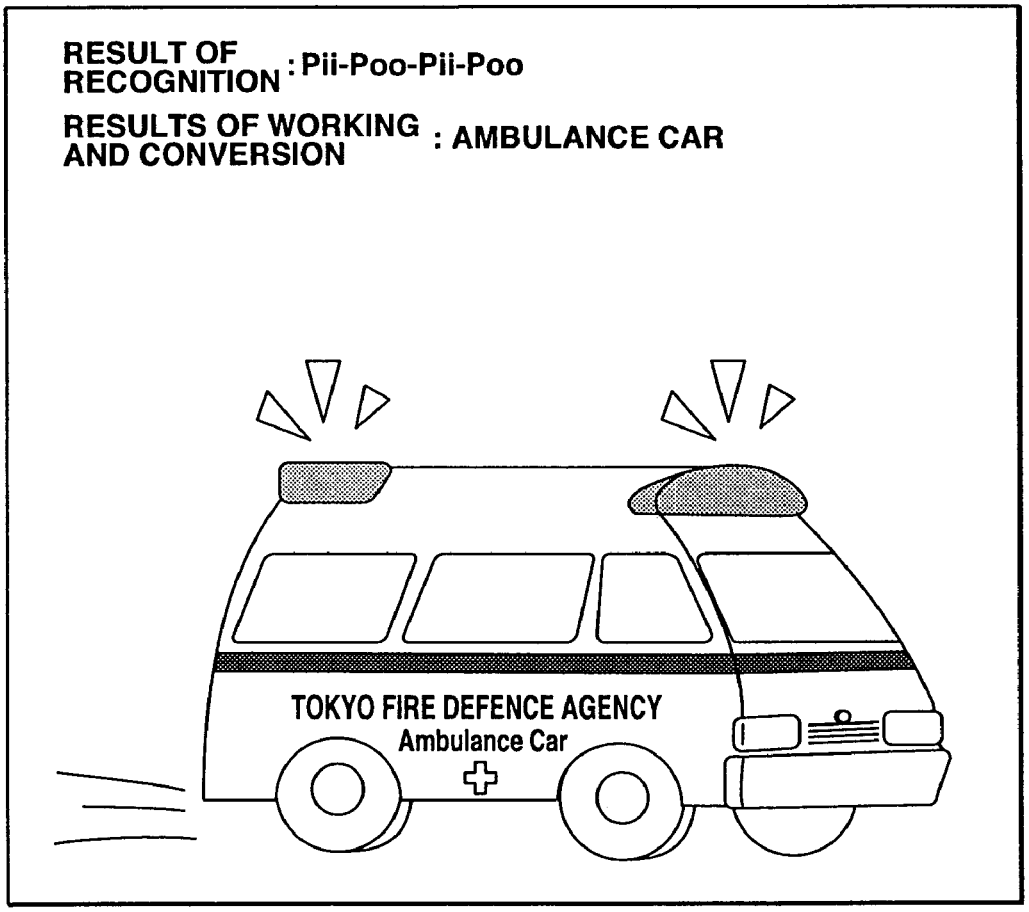
FIG. 3 illustrates an example of displaying the results of recognition and the results of transformation in a display unit of the HA of the present invention.
Figure 4:
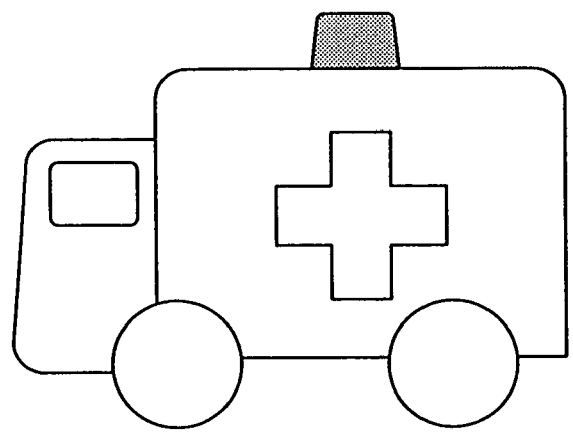
FIG. 4 illustrates an example of displaying the results of transformation in a display unit of the HA of the present invention.

In the example shown in FIG. 3, from the recognition result of the signal processor 22, the speech information generating unit 23 displays the words "Pii Poo Pii Poo" (ambulance sound), and from the transformation result (obtained by transforming the recognition result), displays "AMBULANCE." Also, as an additional transformation result, it reads out and displays, from a variety of graphic representations of ambulances stored in the memory 24, a still graphic of an ambulance racing along with its emergency lights flashing, or a motion picture to that effect. As another example, if a tsunami alarm is received by the microphone 21, the speech information generating unit 23 might display a word representing the alarm "WHEEEN" (for tsunami) from the result of recognition of the signal processor 22, while displaying "TSUNAMI" as the result of transformation of the recognition result. Moreover, as a further transformation result, a graphic of a tsunami swallowing up a house on the coast (or a motion picture of a tsunami swallowing up a house as it breaches the coast), can be read out from the memory 24 and displayed, as way of indicating a tsunami emergency. To conserve storage space in the memory 24, the speech information generating unit 23 could display a simplified pattern on the display unit 26, as shown in FIG. 4.

Thus in the speech information generating unit 23, speech inputs of 'ambulance' or 'tsunami' do not simply produce pictures of an ambulance or tsunami. Rather, non-linguistic sound inputs expressing an on-going emergency produce imagery indicative of the seriousness of the emergency.

Figure 5:
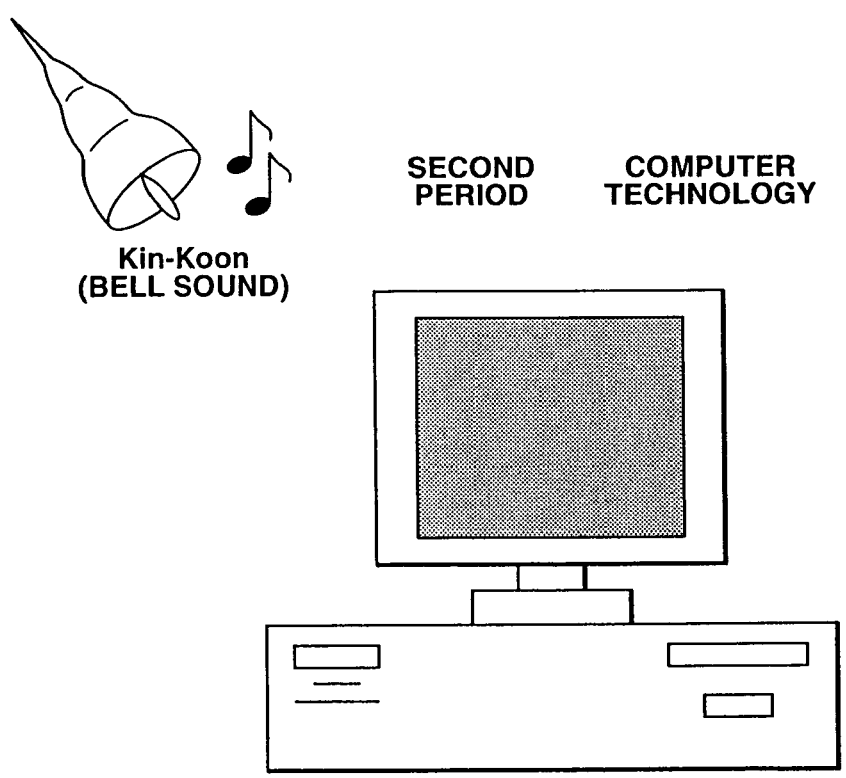
FIG. 5 illustrates another example of displaying the results of recognition and the results of transformation in a display unit of the HA of the present invention.

As a further example, the speech information generating unit 23 could be responsive to the inputting to the microphone 21 of the sound of a chime announcing the second period of a school class schedule (in this example, the period for a class on computer technology), to display the word "ding dong" (a bell sound) along with the graphic image of a bell, as the result of the transformation of a recognition result (FIG. 5). In addition, the speech information generating unit 23 could display the words "second period" "computer technology" in association with a time clock function and with the previously input schedule program, while displaying an image (a personal computer) representing the teaching schedule for computer technology.

Thus, with an HA 1 having a speech information generating unit 23 as described above, in addition to displaying, on the display 26, recognition results and transformation results for speech inputs, other information can be furnished to the user using speech and information entered into the system in advance.

The speech information generating unit 23 performs a transformation operation on the descriptive content and other parameters of the recognition result of the signal processor 22. The speech information generating unit 23 could also perform different transformation, responsive to the amplitude and frequency response of the speech detected by the microphone 21, reading out different images from the memory 24 to display different results of transformation on the display unit 26. This would allow the HA 1 to present more detailed results of speech recognition, thus to improve speech recognition by the user. The speech information generating unit 23 can also be responsive to the amplitude (loudness) of the sound of an ambulance siren picked up by the microphone 21. For example, if the speech information generating unit 23 determines that the amplitude of the siren exceeds a pre-set value, it might display a large graphic of an ambulance as shown FIG. 6A; whereas, if the amplitude of the siren sound is less than the pre-set value, it would display the smaller ambulance shown in FIG. 6B. Taking this a step further, by gradually increasing the size of the displayed ambulance graphic as the siren of the approaching ambulance grows louder, the HA 1 can improve the user's recognition of this outside sound.

Information contained in the speech data such its loudness, or non-linguistic characteristics, such as stress and emotion, can be expressed by images (pictures of hands expressing sign language, for example). An example of an application of this function will now be described. The speech input is first subjected to a speech recognition process to convert it to linguistic information, and certain quantitative characteristics such as pitch are also detected. Next, a non-linguistic information extraction process is performed to detect, from the linguistic information and quantitative characteristics, the non-linguistic information's type, and where it is located in the speech data. This information is then sent on for information conversion processing. In a sign language header conversion process, the linguistic information is converted to sign language headers (labels), and in a non-linguistic information conversion process, a search of non-linguistic expression rules is performed according the type and location of the non-linguistic expression. Finally, in a sign language animation generation process, a sign language animation is created using the sign language header information and the sign language non-linguistic information. (See "Analysis of speech prominence characteristics for translating speech dialogue to sign language" Ando H., et al., 1999 meeting of ASJ society of Japan, 377-378, 1999).

In this manner, the speech information generating unit 23 is able to transform speech information using not only the speech detected by the microphone 21, but also speech information using other functions, for presentation in a variety of forms to the user.

The speech information generating unit 23 may also be provided with a function for 'memorizing' transformation and synthesis processing performed in the past. This enables the speech information generating unit 23 to perform a training process that automatically makes improvements to conversion and synthesis processes executed in the past, thereby constantly improving the efficiency of its conversion and synthesis process.

It is also possible for the signal processor 22 and the speech information generating unit 23 to generate recognition results only for the speech of a person conversing with the user, and to present these results via the loudspeaker 25 and/or display, to notify the user, and also, for example, to perform speech recognition only for a specified noise.

In short, the signal processor 22 and the speech information generating unit 23 can perform speech recognition processing on the input sound to transform the recognition result according to the physical state of the user, the operating conditions, and/or the purpose for using the HA 1, thus to generate and output speech information in forms of expression that are easy for the user to understand.

The foregoing explanation of an HA 1 using the present invention described an example wherein the information generating unit 23 generated speech information for output by combining speech information that was previously sampled and stored in the memory 24. As an alternative, however, the speech information generating unit 23 may also be provided with a speech data converter for performing a speech information conversion process on speech information stored when speech information is generated by combining speech data stored in the memory 24. An HA 1 provided with such a speech data converter, could, for example, be operated so as to change the sound quality of the speech output by the loudspeaker 25.

In the foregoing description of an HA 1 using the present invention, speech obtained by sampling the speech of the user prior to a laryngectomy was stored in the memory 24. Alternatively, instead of a single version, multiple versions of speech may be sampled in advance and stored in the memory 24. That is, speech data obtained by sampling speech prior to laryngectomy, and speech data for speech that is similar to the speech as it was prior to laryngectomy, for example, may be stored in the memory 24. In addition, speech data for speech that sounds completely different could be stored, as could other speech data from which data for pre-laryngectomy speech could easily be generated. With multiple versions of speech data stored in the memory 24, the speech information generating unit 23 can define relationships between the versions (using, for example, a relational equation) and then use the stored speech data selectively, when generating speech data for output.

Moreover, in the foregoing explanation of an HA 1 using the present invention, speech data sampled and stored in the memory 24 are synthesized to generate and output the speech information. It is, however, possible to process the speech information obtained by synthesis of the speech data stored in the memory 24 with vocoder processing, such as voice conversion with the STRAIGHT voice synthesis system, for converting the speech to a sound that is different from the speech represented by the sampled and stored speech data.

The signal processor 22 could also be configured to perform speaker recognition processing on the input speech, and to generate a different recognition result for various speakers conversing with the user. When it outputs the recognition result, this signal processor 22 could then also output information on the speaker, to the loudspeaker 25 and/or the display unit 26, for presentation to the user.

For speaker recognition in the HA 1, vector quantization may be used (see "On the use of instantaneous and transition spectral information in speaker recognition" Soong F. K., Rosenberg A. E., Proc. of ICASSP 86, 877-80, 1986). In speaker recognition using vector quantization, as preparatory processing, parameters expressive of the spectral characteristics of the speech are extracted from the learning speech data for registered speakers. These parameters are then clustered to create codebooks. The vector quantization method is based on the fact that the characteristics of the speakers are reflected in these codebooks. To perform recognition, vector quantization is executed using the input speech and the codebooks for the all of the registered speakers to compute the quantization distortion (spectral errors) for the input speech data in its entirety. The speaker recognition and verification decisions are then made, based on the computation results.

For speaker recognition in the HA 1, a method based on the hidden Markov model (HMM) may also be used (see "Text-dependent speaker identification using circular hidden Markov models" Zheng Y. C., Yuan B. Z., Proc. of ICASSP 88, 580-582, 1988). In this method, 'speakers' (people who converse with the user) are registered and enter a preparatory stage for training the system. An HMM is created for each speaker from speech data for training that is input during the preparatory stage. The HMM method is based on the proposition that the characteristics of a speaker will be reflected in state transition and symbol output probabilities. In the speaker recognition stage, a 'likelihood' according to HMM is computed from the input speech for all registered speakers, and a decision rendered. The HMM structure may be an ergodic HMM for left-to-right models.

In addition, in the HA 1, speech input to the microphone 21 may be translated and output in another language by using, for example, the ATRSPREC speech recognition process, the CHATR speech synthesis process, and the TDMT language translation process. These are processes used in the ATR MATRIX (multilingual automatic translation system for information exchange) speech translation system developed by ATR ITL (Advanced Telecommunications Research Institute Interpreting Telecommunications Laboratories: see "ATR MATRIX: a spontaneous speech translation system between English and Japanese" Takezawa T., et al., ATR J2, 29-33, June 1999.)

In the ATRSPREC speech recognition process, real-time large vocabulary continuous speech recognition is performed, with speech recognition tools used to process the steps from construction of the acoustic models required for speech recognition and language models, through signal processing and searching. In this speech recognition process, the executed processes form a complete tool set that features easy tool integration and guaranteed compatibility with HTK (Hidden Markov model Tool Kit). In this speech recognition process, speech recognition for unspecified speakers can also be performed.

The ATRSPREC speech recognition process comprises a set of tools for performing the functions indicated in (a)-(d) below, which together form the speech recognition process flow. The ATRSPREC speech recognition process operates in a UNIX environment (OSF 1, HP-UX).

(a) Signal processing: The waveform of speech spoken by a human being is converted to a 'characteristic vector' (extracted speech characteristic data required for the speech recognition process).

(b) Acoustic model construction: The relationship between the characteristic vector and the spoken content is modeled as a parameter estimation. Speaker adaptation may also be performed at this time. An HMnet (Hidden Markov model network) adapted to a specific speaker is created, using the HMnet for a standard speaker, and a small amount of speech sampling. The HMnet is created using ML (maximum likelihood) estimation, MAP (maximum a posteriori) estimation, VES (vowel extraction from SER), and MAP-VFS (MAP-Vector Field Smoothing).

(c) Language model construction: Language information, such as words and grammatical constraints, is modeled.

(d) Search: The spoken content is estimated using an acoustic model or a language model.

The language translation process (TDMT: transfer-driven machine translation) uses transfer-driven example translation and dependent sentence structure analysis to advance the translation process from phrase to clause and from clause to sentence.

In the TDMT translation process, translation is performed using a process for judging the sentence structure. The process handles a wide variety of expressions such as dialog-specific colloquial expressions. In this translation process, even when portions of the speech fail to be picked up by the microphone 21, the system will perform a partial translation, translating as much of the translatable portion as possible, such that when a sentence cannot be accurately translated in its entirety, it will still be possible to convey most of what the user and/or another speaker intended to convey.

In the CHAIR speech synthesis process, a database is prepared in advance from a large number of speech units, and the units most appropriate for the sentence to be output are selected from the database and assembled to synthesize the speech. This makes it possible to output smooth speech. In this speech synthesis, the speech data that most nearly approximates the speaker's voice is used to synthesize a voice similar to the speaker's. In this speech synthesis, the speech information generating unit 23 can also determine the sex of the speaker from the input speech, and output speech that is synthesized in an appropriately adapted voice.

In the CHAIR speech synthesis process, prosody parameters of the sequence of phonemes desired to be synthesized are estimated from phoneme-to-phoneme based on a prosody knowledge base. The speech unit having the optimum prosody information is selected, based on the calculated prosody parameters, to find an index to speech waveform data files. The selected speech units are sliced from the speech waveform file one by one, and interconnected. The generated speech waveform is then output.

When doing speech recognition processing, language translation processing and speech synthesis processing, the system can be connected through the communication circuit 27 to communication equipment such as a portable telephone set, thus to enable bi-directional dialogue through that equipment.

When performing speech recognition processing, language translation processing, and speech synthesis processing in the HA 1, no instructions need to be provided to the system with respect to use, for example, of the bi-directional Japanese/English speech translation system, near real-time recognition, translation, synthesis, or to start talking. The system will perform recognition, translation and synthesis as required to conduct full-duplex, high quality, natural conversation. These speech recognition processing, translation processing and speech synthesis processing functions can provide satisfactory results even when meaningless phrases such as "I say" or "well, . . . ," or more or less colloquial expressions, are input to the microphone 21.

In the ATRSPREC speech recognition process, the speech information generating unit 23 not only judges the sentence structure based on the recognition result from the signal processor 22, but also uses dialogue examples to generate speech information suited to a wide variety of expressions such as colloquial expressions peculiar to the current conversation. If there is any portion of the dialogue that cannot be captured by the microphone 21, the speech information generating unit 23 generates as much of the speech information as it can (if any speech information at all can be generated). In this manner, the speech information generating unit 23 is able to communicate what the user and/or another speaker talking to the user intend to say to the other person to a reasonably satisfactory extent, even if the speech information for a given sentence cannot be accurately generated. It is also possible for the speech information generating unit 23 to generate speech information by translation processing (partial translation function).

In the CHATR speech synthesis process, the speech information generating unit 23 selects those units best suited to a sentence desired to be output, from a large number of speech units stored in advance in a database, and connects the selected units to one another to generate the speech information. This process enables the speech information generating unit 23 to output smooth speech. The speech information generating unit 23 can perform synthesis processing in the voice most nearly approximating the speaker's voice by employing the speech data closest to the speaker's voice; and can judge the gender of the speaker from the input speech, thus to perform speech synthesis with a matched voice, for generating the speech information.

It is also possible for the speech information generating unit 23 to extract only the sound of a specified sound source, and output the extracted sound to the loudspeaker 25 and/or to the display unit 26. Thus, it is possible for the HA 1 to artificially produce a 'cocktail party phenomenon,' that is, to extract only the sound of the particular sound source from a mixture of sounds coming from multiple sound sources being heard.

It is also possible for the speech information generating unit 23 to correct mis-auding errors in order to generate speech information using a technique that uses examples having analogous prosody, for correcting the error-corrupted recognition result (see "A computer recovering its own misheard—Guessing the original sentence from a recognized result based on familiar expressions" Ishikawa K., Sumida E., ATR J37, 10-11, 1999). When this is done, the speech information generating unit 23 executes the process in accordance with the physical state of the user, the operating conditions, and/or the purpose for using the system, thus to perform transformation in a manner that will produce output that is easy for the user to understand.

In the foregoing explanation of the HA 1 according to the present invention, speech detected by the microphone 21 is subjected to speech recognition processing and speech generation processing. It is, however, possible to provide an actuating input unit 28 for being acted on by the user etc. to cause the data inputted to the actuating input unit 28 to be converted by the signal processor 22 into speech and/or images. This actuating input unit 28 may, for example, be worn on the user's finger, such that finger movements can be detected to generate data for output to the signal processor 22.

The HA 1 may also be provided with apparatus for generating text and/or image data in which the user touches a liquid crystal pad with a pen, for example, to write text or and/or draw pictures. Text and/or image data is then generated based on data read into the system as a locus of points describing the image drawn on the liquid crystal pad. The HA 1 subjects the generated text and/or image data to image recognition and/or transformation processing by the signal processor 22 and the speech information generating unit 23, and outputs the thus-processed letters and/or image data.

The HA 1 is not limited to embodiments in which the speech recognition processing is executed by the signal processor 22 using speech from the microphone 21, etc. For example, speech recognition processing may also be executed using signals from a nasal sound sensor, respiratory air-stream sensor, neck-vibration sensor, bone vibrator (such as a mouthpiece-type vibrator), worn by the user or by a person other than the user, or using signals from the microphone 21. In this manner, in the HA 1, the recognition efficiency of the signal processor 22 may be further improved by employing various other sensors in addition to the microphone 21.

As indicated in FIG. 2, the HA 1 may also be provided with a camera system 29 for photographing motion pictures or still images to be displayed on the display unit 26, with, for example, a digital camera with automatic focus and zoom functions. This camera system 29 may be provided as an integral part of the display unit 7 of FIG. 1.

The camera system 29 provided in the HA 1 may also be provided with a function for displaying its photographed images on the display unit 26 after performing an image transformation process on the image to enlarge or distort it, for example, based on the physical state of the user (e.g., having weak or astigmatic vision), the operating conditions, and/or the reason for using the HA 1.

In an HA 1 thus configured, photographed images are output from the camera system 29 through a signal processor circuit comprising a microprocessor, etc., to the display unit 26, for display. The camera system 29 could take an image of a person the user is talking to, and provide it to the user, thus to improve her speech recognition. Photographed images could be output through the communication circuit 27 to an external network; and images taken by a camera system 29 could be input from an external network, through the communication circuit 27, and passed through the signal processing circuit, etc., for display by the display unit 26.

In addition, in the signal processor 22, face recognition and object recognition processes could be performed on a photographed image of a speaker, for output via the speech information generating unit 23 and display by the display unit 26. By so doing, a display of the lips, facial expression, and attitude of the photographed person can be presented to the user to improve her speech recognition.

Described below are methods for performing face recognition using a photography function, for extracting individual facial characteristics to perform recognition of individuals. The invention, however, is not limited to these methods.

In an 'M characteristic' method for identification by matching gray scale images, the image pattern is divided into a mosaic of blocks and the average pixel density of each block is taken as a representative value for the block, in order to compress the data into a low-order vector expressive of the gray scale image.

In a gray scale image characteristic expression referred to as the 'KI characteristic,' an orthogonal space image referred to as an 'eigenface' is obtained by applying the Karhunen-Loeve (KL) expansion to a collection of face image samples, and describing a desired face image in terms of low-order characteristic vectors constructed from coefficients expanded using this eigenface.

There is also a method for performing identification by KF characteristic. The KF characteristic is a low-order spectrum obtained by first transforming a comparison pattern of KI characteristics (based on dimension compression by KL expansion of a collection of face images) to a Fourier spectrum, and then performing dimension compression thereon by applying the KL expansion to a collection of samples, as was done for the KI characteristic.

The above methods may be used for performing face image recognition, which, when performed, will result in individual identity information (i.e., information on who is conversing with the user) being entered into the computer. Having information on who she is talking to will further improve the speech recognition of the user.

More information on face recognition is described in "Human Face Feature Extraction and Identification by Neural Networks" by Kosugi M., Special Interest Group Notes of IPSJ CVIM, 73-72, 1991-07; "Face Recognition Using Eigenface" Turk M. A., Pentland A. P., Proc. CVPR, 586-91, 1991-06; "Robust Face Identification by Pattern Matching Based on KL Expansion of the Fourier spectrum" Akamatsu S., et al., IEICE trans. vol. J76DII No. 7, 1363-73, 1993; and "Learning to Identify and Track Faces in Image Sequences" Edwards G. J., et al., Proc. of FG 98.260-5, 1998.

When performing object recognition, the HA 1 creates a mosaic of a pattern representing an object, and identifies the object by comparing it to an actual photographed image. In this HA 1, the motion vector of a matched object is detected in order to track the object. This improves recognition of speech information generated from sound emitted from the object. For this object recognition processing, a technique used in 'Ubiquitous Talker' (developed by SONY CSL) may be used (see "Ubiquitous Talker: Spoken Language Interaction with Real World Objects" Nagao K., Rekimoto J., Proc. 14th IJCAI 95, 1284-90, 1995)

It is also possible with this HA 1 to photograph a still image by pressing a shutter button as in a digital still camera. It is also possible for the camera system 29 to generate a motion picture, and output the so-generated motion picture to the signal processor 22. In addition, the MPEG (Moving Pictures Experts Group) format may be used as the signal format for motion pictures photographed by the camera system 29. Also, the camera system 29 provided in the HA 1 can further improve the user's speech recognition by photographing 3D images of various speakers, and their lips, for display on the display unit 26.

In such an HA 1, images and voices of the user and others engaged in conversation, and images of the scenes in which the conversations took place, can be recorded for later playback as a review exercise for language training, thus facilitating language training.

Also, with this HA 1, images of speakers conversing with the user can be enlarged for display on the display unit 26. This will both facilitate recognition of the speaker and enhance the user's appreciation of the atmosphere in which the conversation is taking place. This will reduce mis-auding by the user and make it possible to use lip reading to improve speech recognition.

The HA 1 may also be provided with a switch system so that the user can control whether the system will output speech detected by the microphone 21 to the loudspeaker 25; output images photographed by the camera system 29 to the display unit 26; or output both speech and images. This can be accomplished by providing a switching means operable by the user to control the output from the speech information generating unit 23.

By way of an example, the switch system could perform switching such as to enable speech detected by the microphone 21 to be output by the loudspeaker 25 upon detection of voice saying "speech;" to enable an image photographed by the camera system 29 to be output by the display unit 26 upon detection of a voice saying "image:" or to enable both the speech and the image to be output upon detection of a voice saying "speech and image." There may also be provided a switch control system employing the above-described speech recognition. The system may be configured as a switch control system providing a gesture interface for gesture recognition.

This switch system may be provided with a function for switching certain parameters of the camera system 29 (such as its zoom state), to control conditions for photography of images by the camera system 29.

Various examples of systems for outputting speech information generated by the speech information generating unit 23 in the HA 1 are described below. Of course, the present invention is not to be construed as being limited to these examples.

That is, the system in the present HA 1 for outputting speech information is not limited to the use of a loudspeaker 25 or a display 26, but could be of a type, for example, that uses bone-conduction or stimulus applied to the skin. The system for outputting speech information may, for example, use a miniature vibrating magnet placed at the eardrum.

Such an HA 1 may be provided with a pressure plate as a vibrator pad for the vibrator system of a bone-conduction hearing aid, for applying vibrations to the bone behind the user's ear, and which is adapted for outputting, to the vibrator pad, a signal obtained by transformation performed by the speech information generating unit 23 (see "The Adjustment and Effectiveness of Bone-conduction-type Hearing Aids" Sugiuchi T., JOHNS Vol. 11, No. 9, 1304, 1995), or may utilize a tactile sense compensation technique using a tactile aid that employs stimulus applied to the skin. By using the bone vibration and stimulus to the skin techniques, signals could be transmitted from the speech information generating unit 23 to the user. An HA 1 that uses stimulus to the skin would be provided with a tactile aid vibrator array for receiving speech information input from the speech information generating unit 23, such that speech output by the loudspeaker 25 could also be output through the tactile aid and vibrator array.

Although the foregoing explanation of the HA 1 described examples of processing in which speech information was output as speech. The invention is not limited to this mode. For example, the HA 1 may be configured such that the recognition result is presented to the user through a middle ear implant. That is, in such an HA 1, speech information can be sent to the user as an electrical signal that passes through a coil or a vibrator, to be converted thereby to mechanical vibration.

Moreover, the HA 1 may be provided with a cochlear implant system such that recognition results can be presented to the user through a cochlear implant. That is, with this HA 1, speech information can be sent as an electrical signal to a cochlear implant system comprising, for example, an embedded electrode and a speech processor, for presentation of speech information to the user.

Also, the present HA 1 may be provided with an auditory brainstem implant (ABI) system comprising an electrode in contact with the cochlear nucleus (the junction of the cochlear nerves in the myelin cephalon) to send recognition results through the electrode to the user. In this manner, speech information can be sent to the user through an ABI. That is, the HA 1 can send speech information as an electrical signal through an ABI system comprising an embedded electrode, and a speech processor, etc., for presentation to the user.

Also, for a hearing-impaired user who is able to recognize speech in the ultrasonic frequency band, the HA 1, responsive to the physical state of the user, the operating conditions, and/or the user's purpose for using the HA 1, can transform recognition results and transformed recognition results to a speech signal in the ultrasonic frequency band, as speech information for output. The HA 1 can also generate signals in the ultrasonic frequency band using an ultrasound output system such as described in "Bone Conduction Ultrasound: Hosoi, H. et al, Activation of the Auditory Cortex by Ultrasound," Lancet, February 14 351 (9101) 496-497, 1998, and output it through an ultrasonic vibrator, etc., to the user.

The HA 1 may also use a bone-conduction apparatus employing bone-conduction through the tragus, and air-conduction through internal wall of the auditory canal, to present the speech information to the user. An example of such an apparatus is NTT's 'Live-phone' headphone system for the hearing-impaired.

In the foregoing description, an embodiment of the HA 1 provided with multiple output means, such as the loudspeaker 25 and the display unit 26, has been described. However, these output means may be used in combination with each other, or each output means may be used independently of the other. It is also possible for the HA 1 to output speech using a function provided in conventional hearing aids, in which the sound pressure level of the speech input to the microphone 21 is varied, and to present recognition results by the 'other output means' mentioned earlier.

The HA 1 may also be provided with a switch system for effecting control in the speech information generating unit 23 such that the output results from the loudspeaker 25 and/or the display unit 26 can be output either simultaneously, or with a time difference. The HA 1 may also be provided with a switch system for controlling whether the output result is output many times, or only once.

The HA 1 was described above with reference to FIG. 2. However, the HA 1 configuration may also include one CPU for performing a first process of transforming the input speech as described above for display in the display unit 26; one CPU for performing a second process of transforming the input speech as described above for outputting results to the loudspeaker 25; and one CPU for performing a third process of displaying images picked up by the camera mechanism 29.

Such an HA 1 could be configured to (1) operate these process-executing CPUs independently to generate output by performing the first process or the second process; (2) to operate the CPUs simultaneously to generate output by performing the first, second and third processes; or (3) to operate the selected CPUs simultaneously to generate output by performing the first and second processes, the first and third processes, or the second and third processes.

Moreover, in the HA 1, it is possible for the speech information generating unit 23 to control output of the results from each of the above output means simultaneously or with a time difference, depending on the physical state of the user, the operating conditions, and/or the purpose for using the HA 1.

In addition, the HA 1 may have multiple CPUs, including one that performs at least the first process described above, and others that perform the remaining processes.

Such an HA 1 could have one CPU to perform 'speech-to-text synthesis' for converting speech input to text data and outputting it to the display 26; one CPU to perform the STRAIGHT process on the same speech input; and one CPU to perform a process that uses a vocoder process such as STRAIGHT to process the input speech data, and a process for outputting the resulting sound to the loudspeaker 25. In other words, the HA 1 may be configured such that different processes for outputting signals to the loudspeaker 25 and the display 26 are performed by different CPUs.

The HA 1 has CPUs to perform various transformation processes, and processes for outputting to various output devices as described above. Speech data input to the microphone 21 may, of course, be output without undergoing any signal transformation process.

The present HA 1 may be provided with one CPU for performing the above transformation processes, and separate CPUs for performing other transformation processes.

Also, in the present HA 1, processes performed in the speech generating unit 23 for transforming raw recognition results, transformed recognition results, and photographed images (as described above) can be performed while also amplifying and adjusting the tone, gain, and compression of the detected speech electrical signal, as is done in substitute speech production methods that use a conventional, HA prior to outputting the resulting speech signal to the loudspeaker 25.

Also, in the present HA 1, processes performed in the signal processor 22 and the speech information generating unit 23 can be integrated with Fourier transformation and a vocoder process such as STRAIGHT, for example, for performing the processes described above.

Also, the HA 1 according to the present invention was described above as a compact hearing aid for personal use, but it could also be a larger model for use by groups (a desk-top hearing aid for individual training, or a group training hearing aid).

Means for visual presentation of information to the user include the head-mounted display, the head-coupled display, and visual prosthesis (artificial eye), examples of which include (a) Binocular head-mounted display (HMD) in which parallax images are presented to the right and left eyes to produce an apparent 3D effect; or the same image is presented to both eyes such as to produce apparent enlargement of the image.

(b) Monocular HMD;

(c) See-through HMD, used mainly in the 'eye-through' HMD ('Puppet Eyes' developed by ATR) to realize an 'augmented reality' effect (d) Display with a vision assist or vision enhancing function;

(e) Spy-glass-type binocular telescope with auto focusing and visual filter;

(f) System using a contact lens in the eye piece;

(g) Retinal projection display (virtual retinal display, retinal projection display, or intermediary retinal projection display);

(h) Artificial eye (visual prosthesis) The scene around the user is captured by a camera worn by the user, and image processing (characteristic extraction, etc.) is performed to generate image data. A micro-electrical mechanical system (MEMS) micro-machine with an electronic circuit is embedded in the user's body. Operating power and image data from the camera are sent to the MEMS via cable or wireless connection. The MEMS converts the image data to electrical pulse signals analogous to neural signals. These pulses are applied through a stimulating electrode to the cranial nervous system. The artificial eyes are classified as h1 through h4 systems, depending where, in the body, the MEMS is embedded: [h1] cortical implant (see "Artificial Vision for the Blind by Connecting a Television Camera to the Visual Cortex" Dobelle Wm. H., ASAIO J2000; 46, 3-9, 2000); [h2] sub/epiretinal implant (see "Development of an Epiretinal Electronic Visual Prosthesis" Rizzo J. F., et al., Harvard Med., MIT Research program in retinal degenerative diseases and experimental theory, Kluwer Academic Plenum Publishers, 463-470, 1999); [h3] optic nerve implant (see "Micro systems based visual prosthesis" MIVIP (Catholique Univ. Sci. Appliquees Microelectronics Lab.)); and [h4] hybrid retinal implant (cell culture plus retinal implant system developed at Nagoya Univ.).

(i) HMD with line-of-sight input function (HAQ-200, by Shimazu);

(j) Display mounted on other than the head, such as on the ear, whole body, neck, shoulder, face, arm, hand or eyeglasses;

(k) Stereo display (projection type object-oriented display (head mounted projector, as disclosed in "Head-mounted Projector (II) Implementation" Iinami M., et al., Proc. 4th Ann. Conf. of VRSJ, 59-62, 1999), link-typed stereo display);

(l) Spatial immersive displays such as Omnimax, CAVE (see "Surround Screen Projection-based Virtual Reality: The Design and Implementation of the CAVE" Cruz-Neira C., et al., Proc. of SIGGRAPH 93, 135-142, 1993), CABIN, a CAVE-type stereo image device (see Hirose M., et al., IEICE trans. Vol. J81DII No. 5, 888-96, 1998), Small-sized ultra-wide field-of-view displays (projection displays, such as CAVE and HMD, see "Ultra-wide Field of View Compact Display," Endo T., et al., Proc. 4th Annual Conf. of VRSJ, 55-58, 1999), Arch screen; and (m) Other display systems such 'Upton eyeglasses,' which also serve as sunglasses.

For a large (desk top) hearing aid, in particular, a large screen display may be used. Also, in the HA 1 described above, binaural sound may be used as the sound reproduction method (e.g., a 3D acoustic system with a spatially fixed sound source using the 'head related transfer function,' an example of which is the Convolvotron & Acoustertron II (Crystal River Engineering); also, a hearing aid using a dynamic driver unit and an electret microphone (TE-H50, manufactured by SONY). For creating a sound field with more realistic effects, or using a transaural system, a large-sized hearing aid system is preferred (a transaural system with tracking function for audio reproduction, that corresponds to the CAVE system for 3D image reproduction).

In addition, the HMD 2 may be provided with a 3D position detection sensor placed on the user's head. In an HA that has such an HMD 2, the scene displayed on the display can be changed responsive to movements of the user's head.

In an HA 1, that uses 'augmented reality' (AR), a sensor is provided for sensing the user's movement, and AR is created using information detected by the sensor and speech information generated by the speech information generating unit 23 from speech detected by the microphone 21. The speech information generating unit 23 appropriately superimposes virtual reality (VR) over real space by cooperatively using a VR system made up of a system that integrates various sensor systems with a VR-forming system, and a display system. This makes it possible to create AR that augments reality. Thus in the HA 1, when the visual display is used, for information received from images in front of the face, since the user's line of sight does not have to shift very much each time new information comes in, the image is always directly in front of the user, where the image information can be received naturally, and information can be received visually, in a natural state. A system for realizing this capability is described below.

Figure 7:
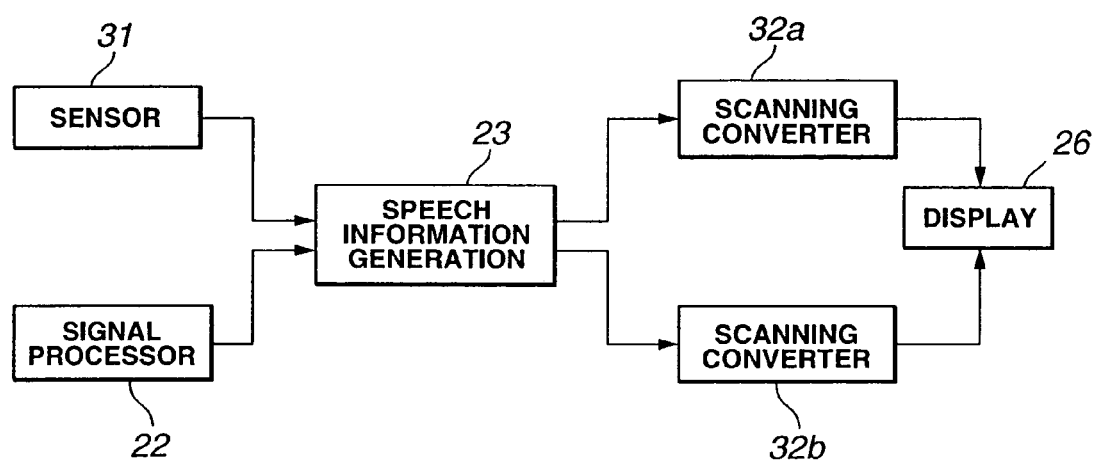
FIG. 7 is a block diagram of a system for creating augmented reality (AR) in an HA using the present invention.

As shown in FIG. 7, in such an HA 1, to form AR, a configuration capable of supporting computer graphics 3D views is constructed by providing, in the speech information generating unit 23, a 3D graphic accelerator for generating virtual environment video, and a wireless communication system. Provided in this HA 1 for acquiring data on the location and body position of the user, is a sensor 31. The sensor 31 has a small gyro sensor (Datatech GU-3011) for the head, and an acceleration sensor (Datatech GU-3012) on the user's waist. After data from the sensor 31 is processed by the speech information generating unit 23, a process is performed in a scan converter 32a for the user's right eye and a scan converter 32b for the left eye to enable the system to be used for video going to the display unit 26. (See "Manual-less Operation With Wearable Augmented Reality System" Ban Y., et al., Proc. 3rd Ann. Conf, of VRSJ, 313-4, 1998).

In a system configured as described above, AR may be realized by performing the following steps: (1) searching for markers in the video stream coming from the camera; (2) finding the 3D position and orientation of the markers; identifying the markers; (3) positioning and orienting objects; (4) rendering 3D objects in video frames; and (5) outputting the video stream to the HMD. (Re: 'Integrating Real and Virtual Worlds in Shared Space,' by ATR MIC Labs and HIT Lab., Univ. of Washington.)

In the present HA 1, AR can be reinforced through cooperative use of, in addition to the sensor 31, a status recognition system such as 'Ubiquitous Talker' (Sony CSL), and various other sensor systems (described below) to form a VR system, a system for integrating the VR-forming systems, a display system, and this HA 1. This makes it possible to use multimodality to augment speech information.

To create VR/AR space, the user sends the sensor 31 information from the user herself, and that information is forwarded to the system for integrating the VR-forming systems. The VR/AR space is then created when information is sent from the display system to the user.

Devices that can be used for the sensor 31 (data input system) are described below.

The following devices may be used as devices to capture the movements of the human body or act on the space: an optical 3D sensor for measuring position (ExpertVision HiRES and Face Tracker (Motion Analysis)), a magnetic 3D sensor for measuring the position (InsideTrack (Polhemus), the 3SPACE system (Polhemus), Bird (Ascension Tech)), a mechanical 3D digitizer (MICROSCRIBE™ 3D Extra (Immersion)), a magnetic 3D digitizer (Mode1350 (Polhemus)), a sonic 3D digitizer (Sonic Digitizer (Science Accessories)), an optical 3D scanner (3D Laser Scanner (ASTER)), a live body sensor (for measurement of electricity in the body), cyber-finger (NTT human interface lab.), a glove device (DATAGLOVE™ (VPL Res), SuperGlove (Nissho Electronics) CYBERGLOVE™ (Virtual Tech)), a force-feedback device (Haptic Master (Nissho Electronics), PHANTOM™ (SensAble Devices), a 3D mouse (Space Controller (Logitech)), a line-of-sight sensor (eye-movement analyzing machine manufactured by ATR audio-visual sense mechanism research lab), a system for measuring the motion of the whole body (DATASUIT™ (VPL Res)), a motion capture system (HiRES (Motion Analysis)), a sensor for measuring acceleration (3D semiconductor acceleration sensor (manufactured by NEC), a HMD with a function for inputting line-of-sight, and a positioning system (example: GPS (global positioning system)).

For realizing VR and AR, not only the display unit 26, but also a haptic display using the haptic sense, a tactile display, a force display, and an olfactory display, may be used. Speech recognition by the user can be improved by providing input to the haptic sense in addition to the acoustic sense. Speech can be input to the haptic sense by using a haptic display. For a haptic display, a vibration array (an optacon, haptic mouse, or tactile vocoder), or a tactile perception pin array (paperless Braille), may be used. There are also water jet and air-jet devices (PHANTOM, from Sens-Able Devices, and Haptic Master, from Nissho Electronics). Specifically, the HA 1 displays a VR-keyboard in VR-space; and a VR keyboard or VR switch can be used to control processing performed by the signal processor 22 and speech information generating unit 23. This eliminates the need to provide a keyboard, and to extend the hand to press a switch. This makes the system easier for the user to operate, and creates the perception that using the system is not that much different from using a ordinary hearing aid placed in the ear.

For a vestibular equilibrium display, any system (such as a motion bed) that can provide a wide variety of acceleration effects, even when the narrow range of motion is limited by 'wash-out' and 'wash-back,' can be used A study of errors in perception of sound images due to vestibular stimulus ("Interaction Between the Perception of a Moving Sound Image and the Sense of Equilibrium" Ishida Y., et al., Technical committee on psychological and physiological acoustics, ASJ H-95 (63), 1-8, 1995) found that hearing is influenced by vestibular stimulus. This suggests that a vestibular-equilibrium display can be used to assist the auditory sense.

For an olfactory display, the technology described in 'Research on the Olfactory Display' (Hirose M., et al., Proceedings, 75th JSME Annual meeting, 433-434, 1998.4) and used in an olfactory sensor system manufactured by Shimazu Manufacturing can be used.

In this HA 1, a system for recognizing and displaying information obtained from sensors other than speech and image sensors may also be used. One example would be a prototype sign language translation system developed by Hitachi. In this system, sign language input data obtained from a DATAGLOVE™ (VPL Research) is recognized by a sign language word recognition process based on standard sign language word patterns. The recognition result is information-processed by a sentence converter based on word dictionary documentation rules, and output to a display.

Systems that could be used for the VR system-integrating system discussed above include, but are not limited to, the systems described below. Systems that could be used include, for example, a system supplied as a C or C++ library that supports device input, interference computation, and event management, and wherein the application portion is programmed by the user, using the library. A system in which no user programming is required, and an application tool is used to make database and event settings, and execute VR simulation, could also be used. Systems associated with the HA 1 may be interconnected through communication links.

To retain a strong sense of presence when transmitting virtual reality states, a broadband communication path should be used. In the HA 1, the following technologies from the field of 3D computer graphics may be used. The concept is to present faithfully, in images, things that can happen in reality; and to create a non-realistic space to present, in images, things that would be impossible in reality.

This HA 1 uses modeling technology for producing complex and precise models (wire-frame, surface, and solid modeling, Bezier, B spline, and NURBS curves, Boolean calculations, free shape deformation, free shape modeling, particle, sweep, fillet, lofting, meta-balls etc.), rendering technology for rendering real objects having a massy appearance and penumbra (shading, texture mapping, rendering algorithms, motion-blur, anti-aliasing and depth-cueing). The HA 1 uses a key frame method, inverse kinematics, morphing, shrink wrap animation and alpha-channel as animation technologies for setting in motion, the models produced, and for simulating the real world. The 3D computer graphics function is made possible by the above modeling, rendering, and animation techniques. The technology described as 'sound rendering' in the paper 'Computer Graphics' by T. Takala (Proceedings, SIGGRAPH Vol. 26 No. 2, 211-220, 1992) can also be used.

Systems for integrating the above VR systems include the following: VR runtime software [dVS], VR space construction software [dVISE], VR development library [VC Toolkit] (Division Inc.); WORLDTOOLKIT™, WORLDUP™ (SENSE8); VRT (Superscape); RealMaster (Solidray); Constructing VR without a model (see "A Study of Image Editing Technique for Synthetic Sensation" Hirose M., et al., Proceedings, ICAT 94, 63-70, 1994).

The HA 1 may also be connected to a printer for printing out a hard copy of the speech recognition and transformation results, in addition to displaying that information on the display unit 26. This provides an additional means of presenting of the results of speech recognition and transformation, thus to further improve speech recognition by the user.

The present embodiment of the invention has been described above as a portable HA 1 in which the HMD 2 and the computer 3 are interconnected by an optical fiber cable 4. The HMD 2 and the computer 3 interconnection may, however, be a wireless link, with data being transmitted and received by a signal transmission method that use wireless communication (BLUETOOTH™ 2.4 GHz-band frequency-hopping r.f. communication), or a method that uses an infrared beam.

Also, in the present HA 1, not only can the HMD 2 and the computer 3 be interconnected by a wireless connection, but the HA 1 may also be divided into separate units corresponding to the functional blocks shown in FIG. 2. The various units could then be interconnected by wireless such that as a minimum, data could be exchanged between the computer 3 and HMD 2 by wireless, and the computer 3 would therefore not have to be strapped to the user.

The present HA 1 may also be split up, according to the physical state of the user, the operating conditions, and/or the purpose for using the HA 1, into separate units for each of the functional blocks shown in FIG. 2, with the various units interconnected by wireless connections. This would reduce the weight and the bulk of the equipment worn by the user, thus to improve her freedom of movement and speech recognition.

In the HA 1, control of processing by the signal processor 22 and the speech information generating unit 23, version upgrading (with anti-virus software, etc.), maintenance, support to operation centers (with respect to operating methods, complaint processing, etc.) can be accomplished through the communication circuit 27.

To do this, the communication circuit 27 is connected to an outside signal processing server. Then, speech signals and speech information processed with the prescribed signal processing would be obtained by transmitting signals and speech information (generated by the microphone 21, the signal processor 22 and the speech information generating unit 23) to the outside signal processing server.

In an HA 1 equipped with such a communication circuit 27, the amount of signal processing performed internally can be reduced by having the outside signal processing server do much of the speech recognition and transformation processing normally performed by the signal processor 22 and speech information generator 23.

In this HA 1, processing not carried out by the signal processor 22 or speech information generating unit 23 could be done by the external signal processing server based on the physical state of the user, the operating conditions, and/or the purpose for using the HA 1, thus to further improve speech recognition by the user.

Also, with such an HA 1, a greater variety of images types could be displayed on the display unit 26 by downloading image data to be stored in the memory 24 for use by the signal processor 22 or speech information generating unit 23, from the external server, without having to store a large volume of image data in the memory 24. Accordingly, with an HA 1 provided with a communication circuit 27, the number of available images of results of transformation of recognition results can be increased, thus further enhancing speech recognition by the user In this manner, by having the processing executed by an external server and having data required for processing stored in the external server, the physical size of the HA 1 can be reduced, thus making it more portable and more comfortable for the user to wear.

Also, in such an HA 1, by downloading, from an outside server, programs for executing processing in the signal processor 22 and signal information generating unit 23 (processing that differs from the processing for which they were initially programmed), responsive to the physical state of the user, the operating conditions, and/or the purpose for using the HA 1, the processes performed by the signal processor 22 and the signal information generating unit 23 can be customized for the individual user, thus further improving speech recognition by the user.

Also in the HA 1, if signals required for communication with the communication circuit 27 are interrupted, such that communication can no longer be performed, the above processing will automatically be performed by a method that does not use communication. When communication is restored, the system automatically goes back to performing the above processing by the method that uses communication.

For the external network connected to the communication circuit 27, an internet application service provider (ASP) or a data center may be used. If an ASP is used, it may also be used as a virtual private network (VPN) or a commerce service provider (CSP).

For transferring speech information between the HA 1 and an external network, the following technologies, for example, may be used: VoIP (Voice over IP), which transmits speech over the internet; VoFR (Voice over FR), which transmits speech over frame relay networks; or VoATM (Voice over ATM), which transmits speech over ATM networks.

The present HA 1 may be provided with an external input/output terminal (not shown in the drawing) for outputting speech data to an external device, in order to have processes performed by the external device instead of the signal processor 22 or the speech information generating unit 23; or to perform a process to retrieve, from the external device, data necessary for the processing that is performed by the signal processor 22 or speech information generating unit 23.

In such an HA 1, processes not carried out by the signal processor 22 or the speech information generating unit 23 are performed by the external device responsive to the physical state of the user, the operating conditions, and/or the purpose for using the HA 1, thus to further improve speech recognition by the user.

In this HA 1, to increase the available number of images of results of transformation of recognition results, image data could be read-out from the external device, thus to further improve speech recognition by the user.

In this HA 1, some processes can be performed by an external device, and data necessary for internal processing can be stored in the external device. This enables the HA 1 to be made smaller, thus to improve its portability and 'wearability.'

Also, in this HA 1, by reading-out from an external device, programs for executing processing in the signal processor 22 and signal information generating unit 23 (processing that differs from the processing for which they had initially been programmed), responsive to the physical state of the user, the operating conditions, and/or the purpose for using the HA 1, the processes performed by the signal processor 22 and the signal information generating unit 23 can be customized for the individual user, thus further improving speech recognition by the user.

In an HA 1 using the present invention, synthesized speech can be presented to the user by displaying it visually. Because of this capability, the invention can be used to advantage in a variety of applications such as described below.

The invention can be useful as a tool to help mainly people with impaired hearing or speech, in their performance of tasks such as office work (as a wearable computer), authentication work, speech and language training, conferencing, reception work (by telephone, internet etc.), television program production (animation, live video, news, music composition), work in the space program or in transportation (airplane or space vehicle pilot), working with various simulations of the kind used in VR and AR (remote control technology for microsurgery, etc.), market research, military, design, work performed at home, work performed under poor conditions (high noise environments, construction sites, factories, etc.), and sorting tasks, etc.

The invention can also be useful, as a tool to support mainly people with impaired hearing or speech, and people who work with those with hearing/speech problems in the medical care field (primary care, physical examinations, other examinations (such as hearing tests), nursing care, in-home care, medical caregiver, medical caregiver training, medical assistant, industrial medicine (mental health, etc.) clinical therapy (internal medicine, disease), trainer and caregiver for people with brainstem deafness, deafness due to auditory cortex and sub cortical lesion, or with speech disorders such as aphasia. The invention can also be an aid for many activities and systems participated in or used by people with speech/hearing problems, including: learning foreign languages, amusement (TV games with communication functions), personal home theaters, attendance at concerts or games etc., communication and exchange of information among players and between players and coaches engaged in sports, vehicular navigation systems, education, use with home information technology, communication (automatic telephone interpretation), digital business transactions, ASP/CSP, online-shopping, digital currency, digital wallet, digital debit card transactions, account settlement, stock transactions, banking operations (money market, derivatives) communication (for people with voice-speech disorders, the critically ill, people with serious physical handicaps, amusements (fish tank VR displays in amusement parks, etc., naked eye stereoscopic 3D systems, VR and AR using the Telexistence visual system, R Cube using the Telexistence visual system, politics (participation in elections etc.), sports training (auto racing, yacht racing, etc.), adventure sports (mountain climbing, scuba diving, etc.), travel, conference exhibit hall browsing, shopping, religion, devices that use ultrasound, home school, home security, uses while interconnected with equipment/services (AUDIBLEPLAYER™, MOBILEPLAYER™ (Audible Inc.)) for digital music, digital newspapers, digital books, interactive data communication television, digital commerce (EC electric commerce), connection to a TV telephone capable of data communication, connection to a PDA (portable digital assistance) such as V phonet (Tietech Co.), advertisement, cooking, use with sign language (examples: sign language interpreting/generating systems, sign language animation software (Mimehand by HITACHI)), underwater operations, such as underwater conversation and communication when diving.

Also, in the HA 1, applications for processes performed by ordinary personal computers (word processing, image processing, internet browsing and email software) can also be stored in the memory 24 and executed.

INDUSTRIAL UTILITY

As described in detail above, a speech transformation apparatus according to the present invention comprises an acousto-electric conversion means, a recognition means, and a transformation means. Speech detected by the acousto-electric conversion means is speech-recognition-processed by the recognition means to obtain a recognition result. The transformation means transforms this recognition result responsive to the physical state of a user, the conditions under which the apparatus is being operated, and/or the purpose for which it is being used. In addition, the raw (untransformed) recognition result and/or the recognition result after transformation by the transformation means, can be output from an output means, responsive to the physical state of the user. Therefore, in addition to the speech, information indicative of the meaning-wise content of the speech (graphics, for example) can be displayed, thus both audible speech and imagery can be used to augment the user's sense of hearing.

A speech transformation method according to the present invention comprises: detecting speech for generating a speech signal; performing a speech recognition process using a speech signal from the acousto-electric conversion means; transforming the recognition result responsive to the physical state of the user, the operating conditions, and/or the purpose for using the apparatus; and outputting a recognition result responsive to the physical state of the user. By so doing, in addition to the speech, information indicative of the meaning-wise content of the speech (graphics, for example) can be displayed, thus both audible speech and imagery can be used to augment the user's sense of hearing.

The invention claimed is:

1. A prosthetic hearing device comprising:
   i. a sensor for detecting a speech;
   ii. a speech recognition processor that performs speech recognition on the detected speech, wherein the speech recognition processor performs speech recognition, in view of at least one of a physical state of the user and an operating condition of the prosthetic hearing device;
   iii. a speech generator that analyzes results of speech recognition to comprehend a semantic meaning in the detected speech and transforms the detected speech into a speech having a speech form assistive in understanding the semantic meaning in the detected speech;
   iv. an output device that outputs the generated speech to a user; and
   v. an input device, wherein the speech generator, when receiving a reproduction instruction through the input device from the user, reproduces the speech previously produced.

2. A prosthetic hearing device of claim 1, wherein the speech recognition processor performs at least one of speaker recognition, speaker identification and speaker verification, and the speech generator generates the speech representing results of the recognition, identification and/or verification.

3. A prosthetic hearing device of claim 1, wherein the speech generator transforms the detected speech in view of at least one of a physical state of the user, an operating condition of the prosthetic hearing device and a purpose for use of the device by the user.

4. A prosthetic hearing device of claim 1, wherein the speech generator transforms the detected speech by adding thereto a modifying language.

5. A prosthetic hearing device of claim 1, wherein the speech generator reproduces a speech previously produced when it determines from the results of the speech recognition that it is necessary to reproduce the previously produced speech.

6. A prosthetic hearing device of claim 1, wherein the speech data generator controls an output rate of the speech data.

7. A prosthetic hearing device of claim 1, wherein the output device outputs the speech using sample speech data synthesized by the speech generator.

8. A prosthetic hearing device of claim 1, further comprising a memory that has stored samples of speech data, wherein the output device outputs the speech data using sample speech data selected by the speech data generator from the memory.

9. A prosthetic hearing device of claim 1, wherein the speech generator generates the speech that summarizes the detected speech.

10. A prosthetic hearing device of claim 1, wherein the sensor selectively detects a speech from a specific speech source.

11. A prosthetic hearing device of claim 1, further comprising a display, wherein the speech generator displays on the display an image associated with the semantic meaning in the detected speech.

12. A prosthetic hearing device comprising:
    i. a sensor for detecting a speech;
    ii. a speech recognition processor that performs speech recognition on the detected speech;
    iii. a speech generator that analyzes results of speech recognition to comprehend a semantic meaning in the detected speech and transforms the detected speech into a speech having a speech form assistive in understanding the semantic meaning in the detected speech, wherein the speech generator transforms the detected speech in view of at least one of a physical state of the user and an operating condition of the prosthetic hearing device;
    iv. an output device that outputs the generated speech to a user; and
    v. an input device, wherein the speech generator, when receiving a reproduction instruction through the input device from the user, reproduces the speech previously produced.

13. A prosthetic hearing device of claim 11, further comprising a memory that has stored a library of images comprising still and motion pictures, symbols, characters, notes, photos, animations, illustrations, voice spectrum patterns and colors, wherein the speech generator selects and displays at least one image associated with the semantic meaning in the detected speech.

* * * * *